(12) United States Patent
Stigloher et al.

(10) Patent No.: US 12,502,524 B2
(45) Date of Patent: Dec. 23, 2025

(54) CARDIAC PUMP WITH OPTICAL FIBER FOR LASER DOPPLER

(71) Applicant: Kardion GmbH, Stuttgart (DE)

(72) Inventors: Johannes Stigloher, Stuttgart (DE); Johannes Bette, Balingen (DE); Attila Fabiunke, Unterensingen (DE); Marvin Mitze, Stuttgart (DE); Hans Christof, Unterensingen (DE)

(73) Assignee: KARDION GMBH, Stuttgart (DE)

( * ) Notice: Subject to any disclaimer, the term of this patent is extended or adjusted under 35 U.S.C. 154(b) by 460 days.

(21) Appl. No.: 18/060,467

(22) Filed: Nov. 30, 2022

(65) Prior Publication Data

US 2023/0173250 A1 Jun. 8, 2023

Related U.S. Application Data

(60) Provisional application No. 63/264,917, filed on Dec. 3, 2021.

(51) Int. Cl.
*A61M 60/523* (2021.01)
*A61M 60/216* (2021.01)
(Continued)

(52) U.S. Cl.
CPC ........ *A61M 60/523* (2021.01); *A61M 60/216* (2021.01); *A61M 60/90* (2021.01); *G01S 13/505* (2013.01)

(58) Field of Classification Search
None
See application file for complete search history.

(56) References Cited

U.S. PATENT DOCUMENTS

| 3,088,323 A | 5/1963 | Welkowitz et al. |
| 4,023,562 A | 5/1977 | Hynecek et al. |
| (Continued) | | |

FOREIGN PATENT DOCUMENTS

| CA | 3 122 415 | 7/2020 |
| CN | 1192351 A | 9/1998 |
| (Continued) | | |

OTHER PUBLICATIONS

Hertz Ph.D et al, "Ultrasonic Engineering in Heart Diagnosis", The American Journal of Cardiology, Jan. 1967, vol. 19, No. 1, pp. 6-17.
(Continued)

*Primary Examiner* — Jon Eric C Morales
(74) *Attorney, Agent, or Firm* — Knobbe, Martens, Olson & Bear, LLP

(57) ABSTRACT

A cardiac assist system having a pumping device for moving blood, wherein a pumping capacity of the pumping device is adjustable using an adjustment signal based on laser doppler with an optical fiber. A measuring device measures a flow rate of the body fluid, the measuring device comprising at least one light source for outputting a light beam and at least one sensor element for detecting a reflected partial beam of the light beam. The measuring device is adapted to measure the body fluid using the reflected partial beam of the light beam. A determination device is adapted to determine the adjustment signal using the measurement signal. The device may include a bore opening to a blood flow channel, with an optical fiber extending through the bore.

15 Claims, 19 Drawing Sheets

(51) Int. Cl.
*A61M 60/90* (2021.01)
*G01S 13/50* (2006.01)

(56) References Cited

U.S. PATENT DOCUMENTS

| | | | |
|---|---|---|---|
| 4,559,952 A | 12/1985 | Angelsen et al. |
| 4,680,730 A | 7/1987 | Omoda |
| 4,781,525 A | 11/1988 | Hubbard et al. |
| 4,888,011 A | 12/1989 | Kung et al. |
| 4,889,131 A | 12/1989 | Salem et al. |
| 5,045,051 A | 9/1991 | Milder et al. |
| 5,269,811 A | 12/1993 | Hayes |
| 5,289,821 A | 3/1994 | Swartz |
| 5,581,038 A | 12/1996 | Lampropoulos |
| 5,606,972 A | 3/1997 | Routh |
| 5,662,115 A | 9/1997 | Torp |
| 5,676,651 A | 10/1997 | Larson, Jr. et al. |
| 5,720,771 A | 2/1998 | Snell |
| 5,752,976 A | 5/1998 | Duffin et al. |
| 5,827,203 A | 10/1998 | Nita |
| 5,865,759 A | 2/1999 | Koblanski |
| 5,888,242 A | 3/1999 | Antaki et al. |
| 5,904,708 A | 5/1999 | Goedeke |
| 5,911,685 A | 6/1999 | Siess et al. |
| 5,964,694 A | 10/1999 | Siess et al. |
| 5,980,465 A | 11/1999 | Elgas |
| 6,007,478 A | 12/1999 | Siess et al. |
| 6,024,704 A | 2/2000 | Meador et al. |
| 6,053,873 A | 4/2000 | Govari et al. |
| 6,167,765 B1 | 1/2001 | Weitzel |
| 6,176,822 B1 | 1/2001 | Nix et al. |
| 6,190,324 B1 | 2/2001 | Kieval et al. |
| 6,231,498 B1 | 5/2001 | Pfeiffer et al. |
| 6,245,007 B1 | 6/2001 | Bedingham et al. |
| 6,314,322 B1 | 11/2001 | Rosenberg |
| 6,351,048 B1 | 2/2002 | Schob et al. |
| 6,398,734 B1 | 6/2002 | Cimochowski et al. |
| 6,432,136 B1 | 8/2002 | Weiss et al. |
| 6,438,409 B1 | 8/2002 | Malik et al. |
| 6,512,949 B1 | 1/2003 | Combs et al. |
| 6,530,876 B1 | 3/2003 | Spence |
| 6,540,658 B1 | 4/2003 | Fasciano et al. |
| 6,540,659 B1 | 4/2003 | Milbocker |
| 6,561,975 B1 | 5/2003 | Pool et al. |
| 6,579,257 B1 | 6/2003 | Elgas et al. |
| 6,602,182 B1 | 8/2003 | Milbocker |
| 6,731,976 B2 | 5/2004 | Penn et al. |
| 6,879,126 B2 | 4/2005 | Paden et al. |
| 6,912,423 B2 | 6/2005 | Ley et al. |
| 6,949,066 B2 | 9/2005 | Bearnson et al. |
| 7,010,954 B2 | 3/2006 | Siess |
| 7,022,100 B1 | 4/2006 | Aboul-Hosn et al. |
| 7,024,244 B2 | 4/2006 | Muhlenberg et al. |
| 7,070,555 B2 | 7/2006 | Siess |
| 7,177,681 B2 | 2/2007 | Xhu |
| 7,513,864 B2 | 4/2009 | Kantrowitz et al. |
| 7,520,850 B2 | 4/2009 | Brockway |
| 7,526,338 B1 | 4/2009 | Gill |
| 7,527,599 B2 | 5/2009 | Hickey |
| 7,591,777 B2 | 9/2009 | LaRose |
| 7,744,560 B2 | 6/2010 | Struble |
| 7,856,335 B2 | 12/2010 | Morello et al. |
| 7,862,501 B2 | 1/2011 | Woodward et al. |
| 7,951,129 B2 | 5/2011 | Chinchoy |
| 7,963,905 B2 | 6/2011 | Salmonsen et al. |
| 7,988,728 B2 | 8/2011 | Ayre |
| 8,211,028 B2 | 7/2012 | Karamanoglu et al. |
| 8,435,182 B1 | 5/2013 | Tamura |
| 8,449,444 B2 | 5/2013 | Poirier |
| 8,545,380 B2 | 10/2013 | Farnan et al. |
| 8,591,393 B2 | 11/2013 | Walters et al. |
| 8,594,790 B2 | 11/2013 | Kjellstrom et al. |
| 8,622,949 B2 | 1/2014 | Zafirelis et al. |
| 8,657,875 B2 | 2/2014 | Kung et al. |
| 8,715,151 B2 | 5/2014 | Poirier |
| 8,747,293 B2 | 6/2014 | Arndt et al. |
| 8,849,398 B2 | 9/2014 | Evans |
| 8,864,644 B2 | 10/2014 | Yomtov |
| 8,876,685 B2 | 11/2014 | Crosby et al. |
| 8,882,477 B2 | 11/2014 | Fritz, IV et al. |
| 8,888,728 B2 | 11/2014 | Aboul-Hosn et al. |
| 8,897,873 B2 | 11/2014 | Schima et al. |
| 8,903,492 B2 | 12/2014 | Soykan et al. |
| 9,297,735 B2 | 3/2016 | Graichen et al. |
| 9,345,824 B2 | 5/2016 | Mohl et al. |
| 9,427,508 B2 | 8/2016 | Reyes et al. |
| 9,427,509 B2 | 8/2016 | Vodermayer |
| 9,474,840 B2 | 10/2016 | Siess |
| 9,492,601 B2 | 11/2016 | Casas et al. |
| 9,511,179 B2 | 12/2016 | Casas et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,566,374 B2 | 2/2017 | Spence et al. |
| 9,636,442 B2 | 5/2017 | Karmon et al. |
| 9,656,010 B2 | 5/2017 | Burke |
| 9,669,142 B2 | 6/2017 | Spanier et al. |
| 9,669,144 B2 | 6/2017 | Spanier et al. |
| 9,713,701 B2 | 7/2017 | Sarkar et al. |
| 9,744,282 B2 | 8/2017 | Rosenberg et al. |
| 9,789,236 B2 | 10/2017 | Bonde |
| 9,833,550 B2 | 12/2017 | Siess |
| 9,848,899 B2 | 12/2017 | Sliwa et al. |
| 9,878,087 B2 | 1/2018 | Richardson et al. |
| 9,943,236 B2 | 4/2018 | Bennett et al. |
| 9,950,102 B2 | 4/2018 | Spence et al. |
| 9,999,714 B2 | 6/2018 | Spanier et al. |
| 10,010,662 B2 | 7/2018 | Wiesener et al. |
| 10,029,037 B2 | 7/2018 | Muller et al. |
| 10,052,420 B2 | 8/2018 | Medvedev et al. |
| 10,322,217 B2 | 6/2019 | Spence |
| 10,342,906 B2 | 7/2019 | D'Ambrosio et al. |
| 10,350,342 B2 | 7/2019 | Thomas et al. |
| 10,357,598 B2 | 7/2019 | Aboul-Hosn et al. |
| 10,376,162 B2 | 8/2019 | Edelman et al. |
| 10,413,651 B2 | 9/2019 | Yomtov et al. |
| 10,500,322 B2 | 12/2019 | Karch |
| 10,549,020 B2 | 2/2020 | Spence et al. |
| 10,561,771 B2 | 2/2020 | Heilman et al. |
| 10,561,772 B2 | 2/2020 | Schumacher |
| 10,561,773 B2 | 2/2020 | Ferrari et al. |
| 10,660,998 B2 | 5/2020 | Hodges |
| 10,668,195 B2 | 6/2020 | Flores |
| 10,864,308 B2 | 12/2020 | Muller et al. |
| 11,027,114 B2 | 6/2021 | D'Ambrosio et al. |
| RE48,649 E | 7/2021 | Siess |
| 11,147,960 B2 | 10/2021 | Spanier et al. |
| 11,273,299 B2 | 3/2022 | Wolman et al. |
| 11,285,310 B2 | 3/2022 | Curran et al. |
| 11,298,524 B2 | 4/2022 | El Katerji et al. |
| 11,320,382 B2 | 5/2022 | Aikawa |
| 11,324,395 B2 | 5/2022 | Banik et al. |
| 11,331,082 B2 | 5/2022 | Itoh et al. |
| 11,357,968 B2 | 6/2022 | El Katerji et al. |
| 11,389,639 B2 | 7/2022 | Casas |
| 11,478,629 B2 | 10/2022 | Harjes et al. |
| 11,524,165 B2 | 12/2022 | Tan et al. |
| 11,529,062 B2 | 12/2022 | Moyer et al. |
| 11,581,083 B2 | 2/2023 | El Katerji et al. |
| 11,622,695 B1 | 4/2023 | Adriola et al. |
| 11,628,293 B2 | 4/2023 | Gandhi et al. |
| 11,648,386 B2 | 5/2023 | Poirer |
| 11,653,841 B2 | 5/2023 | Reyes et al. |
| 11,666,746 B2 | 6/2023 | Ferrari et al. |
| 11,668,321 B2 | 6/2023 | Richert et al. |
| 11,684,276 B2 | 6/2023 | Cros et al. |
| 11,684,769 B2 | 6/2023 | Harjes et al. |
| 11,724,091 B2 | 8/2023 | Siess et al. |
| 11,779,234 B2 | 10/2023 | Harjes et al. |
| 11,781,551 B2 | 10/2023 | Yanai et al. |
| 11,790,487 B2 | 10/2023 | Barbato et al. |
| 11,793,994 B2 | 10/2023 | Josephy et al. |
| 11,806,116 B2 | 11/2023 | Tuval et al. |
| 11,806,517 B2 | 11/2023 | Petersen |

(56) References Cited

U.S. PATENT DOCUMENTS

| | | |
|---|---|---|
| 11,813,079 B2 | 11/2023 | Lau et al. |
| 11,826,127 B2 | 11/2023 | Casas |
| 11,832,793 B2 | 12/2023 | McWeeney et al. |
| 11,832,868 B2 | 12/2023 | Smail et al. |
| 11,837,364 B2 | 12/2023 | Lee et al. |
| 11,844,592 B2 | 12/2023 | Tuval et al. |
| 11,844,940 B2 | 12/2023 | D'Ambrosio et al. |
| 11,850,073 B2 | 12/2023 | Wright et al. |
| 11,850,414 B2 | 12/2023 | Schenck et al. |
| 11,850,415 B2 | 12/2023 | Schwammenthal et al. |
| 11,857,345 B2 | 1/2024 | Hanson et al. |
| 11,864,878 B2 | 1/2024 | Duval et al. |
| 11,872,384 B2 | 1/2024 | Cotter |
| 11,883,207 B2 | 1/2024 | El Katerji et al. |
| 11,890,082 B2 | 2/2024 | Cros et al. |
| 11,896,199 B2 | 2/2024 | Lent et al. |
| 11,903,657 B2 | 2/2024 | Geric et al. |
| 11,906,411 B2 | 2/2024 | Graichen et al. |
| 11,911,550 B2 | 2/2024 | Itamochi et al. |
| 11,923,093 B2 | 3/2024 | Moffitt et al. |
| 11,931,073 B2 | 3/2024 | Walsh et al. |
| 11,931,528 B2 | 3/2024 | Rohl et al. |
| 11,986,274 B2 | 5/2024 | Edelman |
| 12,017,076 B2 | 6/2024 | Tan et al. |
| 12,023,476 B2 | 7/2024 | Tuval et al. |
| 12,029,891 B2 | 7/2024 | Siess et al. |
| 12,059,559 B2 | 8/2024 | Muller et al. |
| 12,076,544 B2 | 9/2024 | Siess et al. |
| 12,097,016 B2 | 9/2024 | Goldvasser |
| 12,102,815 B2 | 10/2024 | Dhaliwal et al. |
| 12,144,650 B2 | 11/2024 | Spanier et al. |
| 12,144,976 B2 | 11/2024 | Baumbach et al. |
| 12,178,554 B2 | 12/2024 | Stotz et al. |
| 12,179,009 B2 | 12/2024 | El Katerji et al. |
| 12,194,287 B2 | 1/2025 | Kassel et al. |
| 12,201,821 B2 | 1/2025 | Schlebusch et al. |
| 12,222,267 B2 | 2/2025 | Stotz et al. |
| 12,251,551 B2 | 3/2025 | Liu et al. |
| 12,257,424 B2 | 3/2025 | Schlebusch et al. |
| 12,268,861 B2 | 4/2025 | D'Ambrosio et al. |
| 12,296,158 B2 | 5/2025 | Higgins et al. |
| 12,310,621 B2 | 5/2025 | Murphy |
| 12,310,708 B2 | 5/2025 | Schlebusch et al. |
| 12,311,160 B2 | 5/2025 | Schlebusch et al. |
| 12,324,906 B2 | 6/2025 | Baumbach et al. |
| 12,329,501 B2 | 6/2025 | Moyer et al. |
| 12,329,956 B2 | 6/2025 | Sunagawa |
| 12,329,959 B2 | 6/2025 | Hassan et al. |
| 12,343,518 B2 | 7/2025 | Tuval et al. |
| 12,377,256 B2 | 8/2025 | Stotz et al. |
| 2001/0016686 A1 | 8/2001 | Okada et al. |
| 2001/0039828 A1 | 11/2001 | Shin et al. |
| 2002/0022785 A1 | 2/2002 | Romano |
| 2002/0082585 A1 | 6/2002 | Carroll et al. |
| 2002/0093412 A1 | 7/2002 | Morrison |
| 2002/0147495 A1 | 10/2002 | Petroff |
| 2002/0151761 A1 | 10/2002 | Viole et al. |
| 2003/0130581 A1 | 7/2003 | Salo et al. |
| 2003/0139643 A1 | 7/2003 | Smith et al. |
| 2003/0167002 A1 | 9/2003 | Nagar et al. |
| 2003/0191357 A1 | 10/2003 | Frazier |
| 2003/0199727 A1 | 10/2003 | Burke |
| 2004/0022640 A1 | 2/2004 | Siess et al. |
| 2004/0044266 A1 | 3/2004 | Siess et al. |
| 2004/0065143 A1 | 4/2004 | Husher |
| 2004/0124979 A1 | 7/2004 | Medema |
| 2004/0130009 A1 | 7/2004 | Tangpuz |
| 2004/0167376 A1 | 8/2004 | Peters et al. |
| 2004/0167410 A1 | 8/2004 | Hettrick |
| 2004/0225177 A1 | 11/2004 | Coleman et al. |
| 2004/0241019 A1 | 12/2004 | Goldowsky |
| 2004/0260346 A1 | 12/2004 | Overall et al. |
| 2005/0001324 A1 | 1/2005 | Dunn |
| 2005/0126268 A1 | 6/2005 | Ouriev et al. |
| 2006/0108697 A1 | 5/2006 | Wang |
| 2006/0108901 A1 | 5/2006 | Mao-Chin |
| 2006/0122583 A1 | 6/2006 | Pesach et al. |
| 2006/0196277 A1 | 9/2006 | Allen et al. |
| 2006/0229488 A1 | 10/2006 | Ayre et al. |
| 2006/0287600 A1 | 12/2006 | McEowen |
| 2006/0287604 A1 | 12/2006 | Hickey |
| 2007/0060787 A1 | 3/2007 | Peters et al. |
| 2007/0069354 A1 | 3/2007 | Dangelmaier |
| 2007/0073352 A1 | 3/2007 | Euler et al. |
| 2007/0088214 A1 | 4/2007 | Shuros et al. |
| 2007/0156006 A1 | 7/2007 | Smith et al. |
| 2007/0255352 A1 | 11/2007 | Roline et al. |
| 2007/0266778 A1 | 11/2007 | Corey et al. |
| 2007/0282209 A1 | 12/2007 | Lui et al. |
| 2007/0299325 A1 | 12/2007 | Farrell et al. |
| 2008/0015517 A1 | 1/2008 | Geistert et al. |
| 2008/0082005 A1 | 4/2008 | Stern et al. |
| 2008/0091239 A1 | 4/2008 | Johansson et al. |
| 2008/0097595 A1 | 4/2008 | Gabbay |
| 2008/0102096 A1 | 5/2008 | Molin et al. |
| 2008/0108901 A1 | 5/2008 | Baba et al. |
| 2008/0108930 A1 | 5/2008 | Weitzel et al. |
| 2008/0133006 A1 | 6/2008 | Crosby et al. |
| 2008/0146996 A1 | 6/2008 | Smisson |
| 2008/0210016 A1 | 9/2008 | Zwirn et al. |
| 2008/0248614 A1 | 10/2008 | Yang |
| 2008/0262289 A1 | 10/2008 | Goldowsky |
| 2008/0262361 A1 | 10/2008 | Gutfinger et al. |
| 2008/0269822 A1 | 10/2008 | Ljungstrom et al. |
| 2008/0275339 A1 | 11/2008 | Thiemann et al. |
| 2008/0287799 A1 | 11/2008 | Hall |
| 2008/0306328 A1 | 12/2008 | Ercolani |
| 2009/0024042 A1 | 1/2009 | Nunez et al. |
| 2009/0025459 A1 | 1/2009 | Zhang et al. |
| 2009/0064755 A1 | 3/2009 | Fleischli et al. |
| 2009/0105799 A1 | 4/2009 | Hekmat et al. |
| 2009/0131765 A1 | 5/2009 | Roschak et al. |
| 2009/0204163 A1 | 8/2009 | Shuros et al. |
| 2009/0312650 A1 | 12/2009 | Maile et al. |
| 2010/0010354 A1 | 1/2010 | Skerl et al. |
| 2010/0082099 A1 | 4/2010 | Vodermayer et al. |
| 2010/0160801 A1 | 6/2010 | Takatani et al. |
| 2010/0268017 A1 | 10/2010 | Siess |
| 2010/0298625 A1 | 11/2010 | Reichenbach et al. |
| 2010/0324378 A1 | 12/2010 | Tran et al. |
| 2011/0004075 A1 | 1/2011 | Stahmann et al. |
| 2011/0022057 A1 | 1/2011 | Eigler et al. |
| 2011/0144744 A1 | 6/2011 | Wampler |
| 2011/0160516 A1 | 6/2011 | Dague |
| 2011/0172505 A1 | 7/2011 | Kim |
| 2011/0184301 A1 | 7/2011 | Holmstrom |
| 2011/0186943 A1 | 8/2011 | Pahl |
| 2011/0218435 A1 | 9/2011 | Srinivasan et al. |
| 2011/0230068 A1 | 9/2011 | Pahl |
| 2012/0029408 A1 | 2/2012 | Beaudin |
| 2012/0084024 A1 | 4/2012 | Norcross, Jr. |
| 2012/0150089 A1 | 6/2012 | Penka et al. |
| 2012/0150291 A1 | 6/2012 | Aber |
| 2012/0197141 A1 | 8/2012 | Vanney |
| 2012/0203476 A1 | 8/2012 | Dam |
| 2012/0245404 A1 | 9/2012 | Smith |
| 2012/0247200 A1 | 10/2012 | Ahonen et al. |
| 2012/0310037 A1 | 12/2012 | Choi et al. |
| 2012/0330214 A1 | 12/2012 | Peters et al. |
| 2013/0041204 A1 | 2/2013 | Heilman et al. |
| 2013/0066142 A1 | 3/2013 | Doerr et al. |
| 2013/0072846 A1 | 3/2013 | Heide et al. |
| 2013/0116575 A1 | 5/2013 | Mickle et al. |
| 2013/0144379 A1 | 6/2013 | Najafi et al. |
| 2013/0289376 A1 | 10/2013 | Lang |
| 2013/0303831 A1 | 11/2013 | Evans |
| 2013/0304404 A1 | 11/2013 | Dam |
| 2014/0013852 A1 | 1/2014 | Brown et al. |
| 2014/0030122 A1 | 1/2014 | Ozaki |
| 2014/0100414 A1 | 4/2014 | Tamez et al. |
| 2014/0114202 A1 | 4/2014 | Hein et al. |
| 2014/0200389 A1 | 7/2014 | Yanai et al. |
| 2014/0243688 A1 | 8/2014 | Caron et al. |
| 2014/0275720 A1 | 9/2014 | Ferrari |

(56) References Cited

U.S. PATENT DOCUMENTS

| | | |
|---|---|---|
| 2014/0275727 A1 | 9/2014 | Bonde |
| 2014/0296677 A1 | 10/2014 | McEowen |
| 2014/0303426 A1 | 10/2014 | Kerkhoffs et al. |
| 2014/0342203 A1 | 11/2014 | Elian |
| 2015/0080743 A1 | 3/2015 | Siess |
| 2015/0141832 A1 | 5/2015 | Yu et al. |
| 2015/0141842 A1 | 5/2015 | Spanier et al. |
| 2015/0157216 A1 | 6/2015 | Stigall et al. |
| 2015/0174307 A1 | 6/2015 | Eckman et al. |
| 2015/0190092 A1 | 7/2015 | Mori |
| 2015/0196076 A1 | 7/2015 | Billingslea |
| 2015/0201900 A1 | 7/2015 | Syed |
| 2015/0250935 A1 | 9/2015 | Anderson et al. |
| 2015/0273184 A1 | 10/2015 | Scott et al. |
| 2015/0290372 A1 | 10/2015 | Muller et al. |
| 2015/0306290 A1 | 10/2015 | Rosenberg et al. |
| 2015/0306291 A1 | 10/2015 | Bonde et al. |
| 2015/0307344 A1 | 10/2015 | Ernst |
| 2015/0327921 A1 | 11/2015 | Govari |
| 2015/0335804 A1 | 11/2015 | Marseille et al. |
| 2015/0365738 A1 | 12/2015 | Purvis et al. |
| 2016/0000983 A1 | 1/2016 | Mohl et al. |
| 2016/0008531 A1 | 1/2016 | Wang et al. |
| 2016/0022890 A1 | 1/2016 | Schwammenthal et al. |
| 2016/0045165 A1 | 2/2016 | Braido et al. |
| 2016/0144166 A1 | 5/2016 | Decré et al. |
| 2016/0151553 A1 | 6/2016 | Bonde |
| 2016/0166747 A1 | 6/2016 | Frazier et al. |
| 2016/0213828 A1 | 7/2016 | Sievers |
| 2016/0278856 A1 | 9/2016 | Panescu |
| 2016/0302672 A1 | 10/2016 | Kuri |
| 2016/0303299 A1 | 10/2016 | Muller |
| 2016/0317043 A1 | 11/2016 | Campo |
| 2016/0338629 A1 | 11/2016 | Doerr |
| 2017/0010144 A1 | 1/2017 | Lenner et al. |
| 2017/0021070 A1 | 1/2017 | Petersen |
| 2017/0049945 A1 | 2/2017 | Halvorsen et al. |
| 2017/0086780 A1 | 3/2017 | Sokulin et al. |
| 2017/0098491 A1 | 4/2017 | Ziaie et al. |
| 2017/0128646 A1 | 5/2017 | Karch |
| 2017/0202575 A1 | 7/2017 | Stanfield et al. |
| 2017/0224279 A1 | 8/2017 | Cahan et al. |
| 2017/0239407 A1 | 8/2017 | Hayward |
| 2017/0258980 A1 | 9/2017 | Katsuki et al. |
| 2017/0348470 A1 | 12/2017 | D'Ambrosio et al. |
| 2017/0354812 A1 | 12/2017 | Callaghan et al. |
| 2018/0064860 A1 | 3/2018 | Nunez et al. |
| 2018/0078159 A1 | 3/2018 | Edelman et al. |
| 2018/0093070 A1 | 4/2018 | Cottone |
| 2018/0110910 A1 | 4/2018 | Rodemerk et al. |
| 2018/0126053 A1 | 5/2018 | Zilbershlag et al. |
| 2018/0199635 A1 | 7/2018 | Longinotti-Buitoni et al. |
| 2018/0264182 A1 | 9/2018 | Spanier et al. |
| 2018/0280598 A1 | 10/2018 | Curran et al. |
| 2018/0326131 A1 | 11/2018 | Muller et al. |
| 2018/0333059 A1 | 11/2018 | Casas |
| 2018/0353667 A1 | 12/2018 | Moyer et al. |
| 2019/0054223 A1 | 2/2019 | Frazier et al. |
| 2019/0083690 A1 | 3/2019 | Siess et al. |
| 2019/0217002 A1 | 7/2019 | Urakabe |
| 2019/0240680 A1 | 8/2019 | Hayakawa |
| 2019/0254543 A1 | 8/2019 | Hartholt et al. |
| 2019/0282741 A1 | 9/2019 | Franano et al. |
| 2019/0282744 A1 | 9/2019 | D'Ambrosio et al. |
| 2019/0351117 A1 | 11/2019 | Cambronne et al. |
| 2019/0351118 A1 | 11/2019 | Graichen et al. |
| 2020/0016309 A1 | 1/2020 | Kallenbach et al. |
| 2020/0028376 A1 | 1/2020 | Ha |
| 2020/0038567 A1 | 2/2020 | Siess et al. |
| 2020/0147283 A1 | 5/2020 | Tanner et al. |
| 2020/0164125 A1 | 5/2020 | Muller et al. |
| 2020/0164126 A1 | 5/2020 | Muller |
| 2020/0253583 A1 | 8/2020 | Brisken et al. |
| 2021/0268264 A1 | 9/2021 | Stotz |
| 2021/0290087 A1 | 9/2021 | Schlebusch |
| 2021/0290930 A1 | 9/2021 | Kasel |
| 2021/0290933 A1 | 9/2021 | Stotz |
| 2021/0339002 A1 | 11/2021 | Schlebusch et al. |
| 2021/0339004 A1 | 11/2021 | Schlebusch et al. |
| 2021/0346674 A1 | 11/2021 | Baumbach et al. |
| 2021/0346675 A1 | 11/2021 | Schlebusch et al. |
| 2021/0346676 A1 | 11/2021 | Schlebusch et al. |
| 2021/0346677 A1 | 11/2021 | Baumbach et al. |
| 2021/0346678 A1 | 11/2021 | Baumbach et al. |
| 2021/0378523 A1 | 12/2021 | Budde |
| 2021/0379359 A1 | 12/2021 | Schellenberg |
| 2021/0379360 A1 | 12/2021 | Schellenberg |
| 2022/0016411 A1 | 1/2022 | Winterwerber |
| 2022/0032032 A1 | 2/2022 | Schlebusch et al. |
| 2022/0032036 A1 | 2/2022 | Baumbach et al. |
| 2022/0039669 A1 | 2/2022 | Schlebusch et al. |
| 2022/0047173 A1 | 2/2022 | Stotz et al. |
| 2022/0050037 A1 | 2/2022 | Stotz et al. |
| 2022/0072298 A1 | 3/2022 | Spanier et al. |
| 2022/0079457 A1 | 3/2022 | Tuval et al. |
| 2022/0105339 A1 | 4/2022 | Nix et al. |
| 2022/0126086 A1 | 4/2022 | Schlebusch et al. |
| 2022/0142462 A1 | 5/2022 | Douk et al. |
| 2022/0161019 A1 | 5/2022 | Mitze et al. |
| 2022/0361762 A1 | 11/2022 | Lalancette |
| 2023/0173250 A1* | 6/2023 | Stigloher ............... G01S 13/505 600/17 |
| 2023/0191141 A1 | 6/2023 | Wenning et al. |
| 2024/0011808 A1 | 1/2024 | Winzer et al. |
| 2024/0245902 A1 | 7/2024 | Schlebusch et al. |
| 2025/0032773 A1 | 1/2025 | Baumbach et al. |
| 2025/0121177 A1 | 4/2025 | West |
| 2025/0143587 A1 | 5/2025 | Stotz |
| 2025/0144397 A1 | 5/2025 | Kassel et al. |
| 2025/0222247 A1 | 7/2025 | Schlebusch |
| 2025/0235687 A1 | 7/2025 | Schlebusch et al. |
| 2025/0251330 A1 | 8/2025 | Stotz |

FOREIGN PATENT DOCUMENTS

| | | |
|---|---|---|
| CN | 1661338 A | 8/2005 |
| CN | 101128168 | 2/2008 |
| CN | 101208045 | 6/2008 |
| CN | 101214158 | 7/2008 |
| CN | 101351237 | 1/2009 |
| CN | 101448535 | 6/2009 |
| CN | 101460094 | 6/2009 |
| CN | 101579233 | 11/2009 |
| CN | 101711683 | 5/2010 |
| CN | 102421372 | 4/2012 |
| CN | 102803923 | 11/2012 |
| CN | 103328018 | 9/2013 |
| CN | 103857326 | 6/2014 |
| CN | 103957957 | 7/2014 |
| CN | 104105449 | 10/2014 |
| CN | 104188687 | 12/2014 |
| CN | 106104229 | 11/2016 |
| CN | 106333707 | 1/2017 |
| CN | 107530479 | 1/2018 |
| CN | 107632167 | 1/2018 |
| CN | 215841206 | 2/2022 |
| CN | 217828630 | 11/2022 |
| CN | 219250364 | 6/2023 |
| CN | 118320294 | 7/2024 |
| DE | 195 20 920 | 12/1995 |
| DE | 198 21 307 | 10/1999 |
| DE | 100 59 714 | 5/2002 |
| DE | 100 60 275 | 6/2002 |
| DE | 101 44 269 | 3/2003 |
| DE | 102 26 305 | 10/2003 |
| DE | 10 2006 001 180 | 9/2007 |
| DE | 10 2009 007 216 | 8/2010 |
| DE | 10 2009 011 726 | 9/2010 |
| DE | 10 2009 025 464 | 1/2011 |
| DE | 10 2009 047 845 | 3/2011 |
| DE | 10 2011 106 142 | 12/2012 |
| DE | 20 2011 110 389 | 9/2013 |
| DE | 10 2015 004 177 | 10/2015 |
| DE | 10 2015 219 263 | 4/2017 |

(56) References Cited

FOREIGN PATENT DOCUMENTS

| | | |
|---|---|---|
| DE | 20 2015 009 422 | 7/2017 |
| DE | 10 2016 013 334 | 4/2018 |
| DE | 10 2018 208 536 | 12/2019 |
| DE | 10 2018 208 862 | 12/2019 |
| DE | 10 2018 208 916 | 12/2019 |
| DE | 10 2018 208 927 | 12/2019 |
| DE | 10 2018 208 945 | 12/2019 |
| DE | 10 2018 210 076 | 12/2019 |
| DE | 10 2018 212 153 | 1/2020 |
| DE | 10 2018 213 151 | 2/2020 |
| DE | 10 2018 213 350 | 2/2020 |
| DE | 10 2018 220 658 | 6/2020 |
| DE | 10 2018 222 505 | 6/2020 |
| DE | 10 2020 102 473 | 8/2021 |
| DE | 11 2020 003 151 | 3/2022 |
| EP | 0 794 411 | 9/1997 |
| EP | 0 916 359 | 5/1999 |
| EP | 1 062 959 | 12/2000 |
| EP | 1 339 443 | 11/2001 |
| EP | 1 011 803 | 9/2004 |
| EP | 2 143 385 | 1/2010 |
| EP | 2 175 770 | 4/2010 |
| EP | 2 570 143 | 3/2013 |
| EP | 2 859 911 | 4/2015 |
| EP | 2 213 227 | 8/2016 |
| EP | 3 088 016 | 11/2016 |
| EP | 2 945 661 | 11/2017 |
| EP | 2 136 861 | 12/2017 |
| EP | 3 287 154 | 2/2018 |
| EP | 3 205 359 | 8/2018 |
| EP | 3 205 360 | 8/2018 |
| EP | 3 378 421 | 9/2018 |
| EP | 2 505 090 | 12/2019 |
| EP | 3 668 560 | 6/2020 |
| EP | 3 753 594 | 12/2020 |
| EP | 3 487 548 | 3/2021 |
| EP | 3 615 103 | 3/2021 |
| EP | 3 131 615 | 6/2021 |
| EP | 3 463 505 | 9/2021 |
| EP | 3 884 970 | 9/2021 |
| EP | 3 668 561 | 10/2021 |
| EP | 3 164 168 | 12/2021 |
| EP | 3 344 129 | 12/2021 |
| EP | 3 624 867 | 3/2022 |
| EP | 3 689 389 | 3/2022 |
| EP | 3 737 436 | 3/2022 |
| EP | 3 972 661 | 3/2022 |
| EP | 3 984 589 | 4/2022 |
| EP | 3 654 006 | 5/2022 |
| EP | 2 999 400 | 8/2022 |
| EP | 3 600 477 | 10/2022 |
| EP | 3 897 768 | 10/2022 |
| EP | 2 892 583 | 1/2023 |
| EP | 3 597 231 | 1/2023 |
| EP | 3 003 420 | 2/2023 |
| EP | 3 046 594 | 3/2023 |
| EP | 3 938 005 | 4/2023 |
| EP | 3 809 959 | 7/2023 |
| EP | 2 072 150 | 9/2023 |
| EP | 3 768 156 | 9/2023 |
| EP | 4 052 754 | 10/2023 |
| EP | 3 157 596 | 11/2023 |
| EP | 3 766 428 | 11/2023 |
| EP | 3 781 027 | 11/2023 |
| EP | 4 070 720 | 11/2023 |
| EP | 3 687 596 | 12/2023 |
| EP | 3 566 636 | 2/2024 |
| EP | 3 634 526 | 2/2024 |
| EP | 3 768 347 | 2/2024 |
| EP | 3 790 606 | 2/2024 |
| EP | 3 397 147 | 3/2024 |
| EP | 4 140 532 | 5/2024 |
| EP | 3 693 038 | 6/2024 |
| EP | 3 970 765 | 7/2024 |
| EP | 3 854 444 | 9/2024 |
| EP | 3 793 674 | 10/2024 |
| EP | 3 618 885 | 11/2024 |
| EP | 4 034 221 | 11/2024 |
| EP | 3 809 960 | 12/2024 |
| EP | 4 429 754 | 2/2025 |
| EP | 3 970 785 | 3/2025 |
| EP | 4 429 753 | 3/2025 |
| EP | 3 950 043 | 5/2025 |
| EP | 4 039 319 | 6/2025 |
| EP | 3 848 088 | 8/2025 |
| ES | 2 913 485 | 6/2022 |
| JP | S59-080229 | 5/1984 |
| JP | S61-125329 | 6/1986 |
| JP | S62-113555 | 7/1987 |
| JP | S62-204733 | 9/1987 |
| JP | S62-282284 | 12/1987 |
| JP | S64-68236 | 3/1989 |
| JP | H02-055886 | 2/1990 |
| JP | H02-234750 | 9/1990 |
| JP | H05-079875 | 3/1993 |
| JP | H06-218044 | 8/1994 |
| JP | H07-047025 | 5/1995 |
| JP | H08-057042 | 3/1996 |
| JP | H08-066398 | 3/1996 |
| JP | H08-327527 | 12/1996 |
| JP | H10-052489 | 2/1998 |
| JP | H10-505766 | 6/1998 |
| JP | H11-239617 | 9/1999 |
| JP | 2000-512191 | 9/2000 |
| JP | 2001-037728 | 2/2001 |
| JP | 2001-506140 | 5/2001 |
| JP | 2001-276213 | 10/2001 |
| JP | 2002-525175 | 8/2002 |
| JP | 2003-019197 | 1/2003 |
| JP | 2003-047656 | 2/2003 |
| JP | 2003-062065 | 3/2003 |
| JP | 2004-515278 | 5/2004 |
| JP | 2005-028137 | 2/2005 |
| JP | 2005-192687 | 7/2005 |
| JP | 2006-528006 | 12/2006 |
| JP | 2007-222644 | 9/2007 |
| JP | 2008-511414 | 4/2008 |
| JP | 2006-518249 | 8/2008 |
| JP | 2008-178690 | 8/2008 |
| JP | 2009-504290 | 2/2009 |
| JP | 2009-240348 | 10/2009 |
| JP | 2010-518907 | 6/2010 |
| JP | 2012-520157 | 9/2012 |
| JP | 2013-128792 | 7/2013 |
| JP | 2014-524274 | 9/2014 |
| JP | 2015-514529 | 5/2015 |
| JP | 2015-514531 | 5/2015 |
| JP | 2015-515429 | 5/2015 |
| JP | 2015-122448 | 7/2015 |
| JP | 2015-527172 | 9/2015 |
| JP | 2015-181800 | 10/2015 |
| JP | 2016-002466 | 1/2016 |
| JP | 2016-509950 | 4/2016 |
| JP | 2017-500932 | 1/2017 |
| JP | 2017-176719 | 10/2017 |
| JP | 2017-532084 | 11/2017 |
| JP | 2019-523110 | 8/2019 |
| WO | WO 89/006513 | 1/1989 |
| WO | WO 92/015239 | 9/1992 |
| WO | WO 98/043688 | 10/1998 |
| WO | WO 00/033047 | 6/2000 |
| WO | WO 2006/122001 | 11/2006 |
| WO | WO 2010/142286 | 12/2010 |
| WO | WO 2010/143272 | 12/2010 |
| WO | WO 2012/018917 | 2/2012 |
| WO | WO 2012/112378 | 8/2012 |
| WO | WO 2013/160443 | 10/2013 |
| WO | WO 2014/042925 | 3/2014 |
| WO | WO 2014/141284 | 9/2014 |
| WO | WO 2014/165635 | 10/2014 |
| WO | WO 2015/085220 | 6/2015 |
| WO | WO 2016/001284 | 1/2016 |
| WO | WO 2016/066180 | 5/2016 |
| WO | WO 2016/137743 | 9/2016 |

(56) References Cited

FOREIGN PATENT DOCUMENTS

| WO | WO 2017/032751 | 3/2017 |
| --- | --- | --- |
| WO | WO 2017/066257 | 4/2017 |
| WO | WO 2017/147291 | 8/2017 |
| WO | WO 2017/214118 | 12/2017 |
| WO | WO 2018/005228 | 1/2018 |
| WO | WO 2018/048800 | 3/2018 |
| WO | WO 2018/213089 | 11/2018 |
| WO | WO 2019/034670 | 2/2019 |
| WO | WO 2019/078723 | 4/2019 |
| WO | WO 2019/126721 | 6/2019 |
| WO | WO 2019/219883 | 11/2019 |
| WO | WO 2019/229210 | 12/2019 |
| WO | WO 2019/229220 | 12/2019 |
| WO | WO 2019/234145 | 12/2019 |
| WO | WO 2019/234146 | 12/2019 |
| WO | WO 2019/234148 | 12/2019 |
| WO | WO 2019/234149 | 12/2019 |
| WO | WO 2019/234151 | 12/2019 |
| WO | WO 2019/234152 | 12/2019 |
| WO | WO 2019/234153 | 12/2019 |
| WO | WO 2019/234161 | 12/2019 |
| WO | WO 2019/234162 | 12/2019 |
| WO | WO 2019/234163 | 12/2019 |
| WO | WO 2019/234164 | 12/2019 |
| WO | WO 2019/234166 | 12/2019 |
| WO | WO 2019/234167 | 12/2019 |
| WO | WO 2019/234169 | 12/2019 |
| WO | WO 2019/243582 | 12/2019 |
| WO | WO 2020/030686 | 2/2020 |
| WO | WO 2020/030706 | 2/2020 |
| WO | WO 2020/064707 | 4/2020 |
| WO | WO 2020/243756 | 12/2020 |
| WO | WO 2023/040546 | 12/2021 |
| WO | WO 2022/074136 | 4/2022 |
| WO | WO 2022/109590 | 5/2022 |
| WO | WO 2022/173970 | 8/2022 |
| WO | WO 2023/226779 | 9/2022 |
| WO | WO 2023/049813 | 3/2023 |
| WO | WO 2024/104184 | 5/2024 |

OTHER PUBLICATIONS

Kong et al., "A Stein Equation Approach for Solutions to the Diophantine Equations," 2010 Chinese Control and Decision Conference, Xuzhou, May 26, 2010, pp. 3024-3028.

Koseli et al., "Online Viscosity Measurement of Complex Solutions Using Ultrasound Doppler Velocimetry", Turk J Chem, Jan. 2006, vol. 30, pp. 297-305.

Lombardi et al., "Flow Rate Profiler: an instrument to measure blood velocity profiles", Ultrasonics, 2001, vol. 39, pp. 143-150.

McCormick et al., "Resolution of a 2/spl pi/ Ambiguity Problem in Multiple Frequency Spectral Estimation," in IEEE Transactions on Aerospace and Electronic Systems, Jan. 1995, vol. 31, No. 1, pp. 2-8.

Mushi et al., "Identification of Fluidic Element Models to Simulate the Short-Term Baroreflex", Proceedings of the 45th IEEE Conference on Decision & Control, San Diego, CA, Dec. 13-15, 2006, pp. 6.

Syrmos et al., "A Generalized Bezout Equation in Output Feedback Design," Proceedings of the 31st IEEE Conference on Decision and Control, Tucson, AZ, USA, Dec. 1992, vol. 4, pp. 3590-3594.

Udesen et al., "A Simple Method to Reduce Aliasing Artifacts in Color Flow Mode Imaging", IEEE Ultrasonics Symposium, 2005, Rotterdam, The Netherlands, Sep. 18-21, 2005, pp. 1352-1355.

Atkinson et al., "Pulse-Doppler Ultrasound and Its Clinical Application", The Yale Journal of Biology and Medicine, 1977, vol. 50, pp. 367-373.

Chung et al., "Improved Efficiency Characteristics of Wireless Power Charging System forSuperconducting MAGLEV Train Using Inserted Permanent Magnets," 2018 IEEE International Symposium on Electromagnetic Compatibility, 2018, pp. 564-567.

"ECG Electrodes product comparison chart," 3M.com, 2018, https://multimedia.3m.com/mws/media/14908830/red-dot-ecg-electrodes-comparison-chart.pdf, accessed May 18, 2025, 1 page.

Eeckhout, MD, PhD, et al., "Handbook of Complications During Percutaneous Cardiovascular Interventions", 2007 Informa UK Ltd., Ch. 12, pp. 167-177.

Leguy et al., "Assessment of Blood Volume Flow in Slightly Curved Arteries from a Single Velocity Profile", Journal of Biomechanics, 2009, pp. 1664-1672.

Mack-Haynes, Robin, "Fasteners Made Easy," New Mexico State University, https://pubs.nmsu.edu/_c/C232.pdf, accessed May 18, 2025, pp. 8.

Mullins, Charles E., MD, "Cardiac Catheterization in Congenital Heart Disease: Pediatric and Adult", Blackwell Futura, 2006, Chapters 3, 4 and 32, pp. 101.

Sinha et al., "Effect of Mechanical Assistance of the Systemic Ventricle in Single Ventricle Circulation with Cavopulmonary Connection", The Journal of Thoracic and Cardiovascular Surgery, Apr. 2014, vol. 147, No. 4, pp. 1271-1275.

Tan et al., "Surface Engineering and Patterning Using Parylene for Biological Applications." Materials, Mar. 15, 2010, vol. 3, No. 3, pp. 1803-1832.

"Understanding Hot-Wire Anemometry", Advanced Thermal Solutions, Inc., 2007, pp. 13-17.

Vieli, A., "Doppler Flow Determination", BJA: British Journal of Anaesthesia, 1988, vol. 60, pp. 107S-112S.

Yuanyuan et al., "Characteristics Analysis for Doppler Ultrasound Blood Flow Signals", China Medical Device Information, 5(1), Feb. 28, 1999, pp. 36-42.

Zhang, Dabiao et al., "Design of Microwave Velocity and Distance Monitor System", Instrument Technique and Sensor, Hebei Normal University, Apr. 25, 2004, pp. 3.

\* cited by examiner

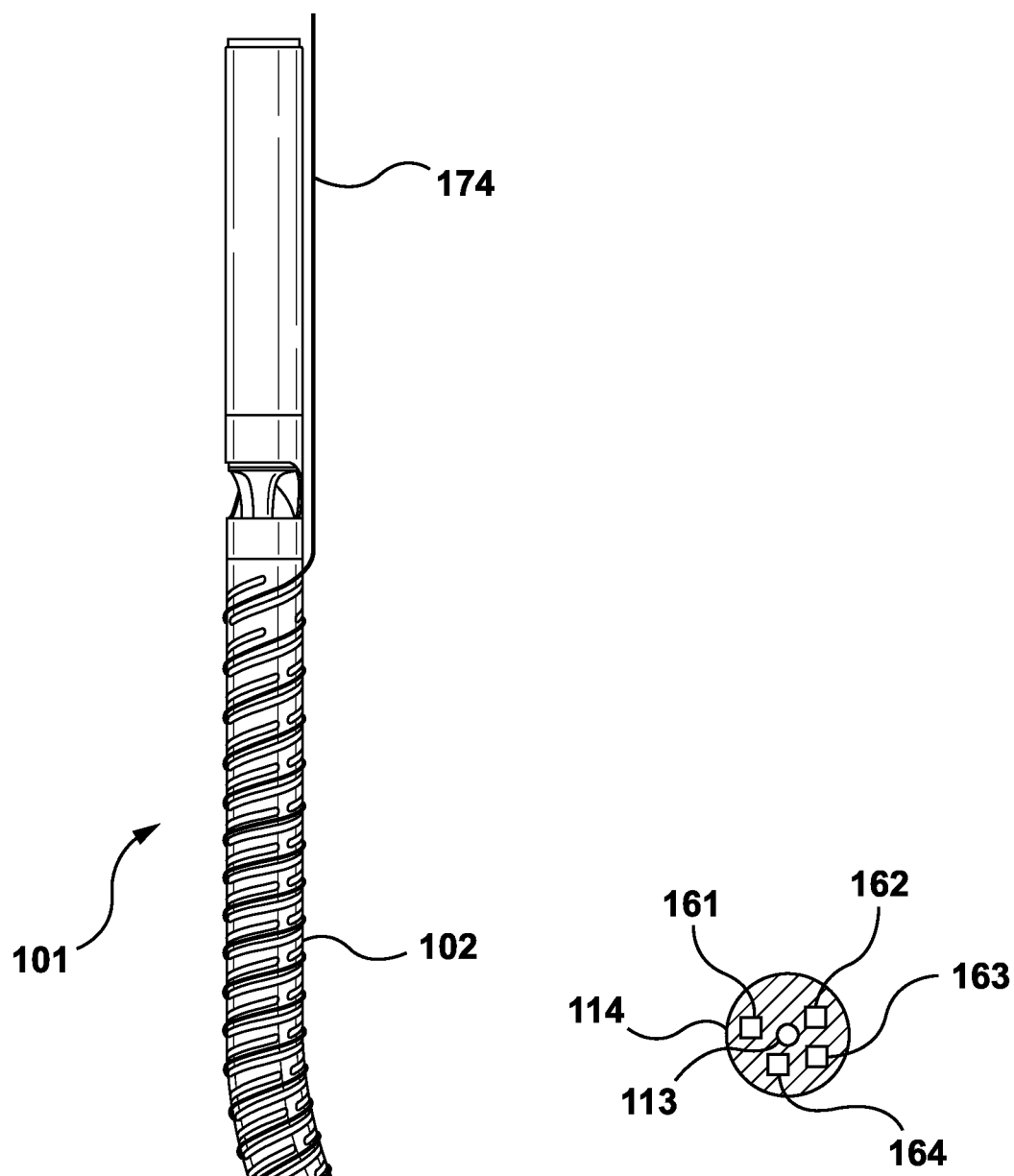
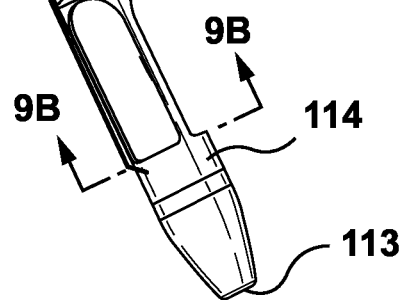
FIG. 9A
FIG. 9B

CARDIAC PUMP WITH OPTICAL FIBER FOR LASER DOPPLER

INCORPORATION BY REFERENCE TO RELATED APPLICATIONS

Any and all applications for which a foreign or domestic priority claim is identified in the Application Data Sheet as filed with the present application are hereby incorporated by reference under 37 CFR 1.57. For example, this application claims priority to U.S. Provisional Patent Application 63/264,917, entitled "CARDIAC PUMP WITH OPTICAL FIBER FOR LASER DOPPLER" Filed Dec. 3, 2021, the entire content of which is incorporated by reference herein in its entirety for all purposes and forms a part of this specification.

BACKGROUND

Technical Field

The technology relates to a cardiac assistance system or pump, in particular to a cardiac assistance system having features for an optical fiber for performing laser doppler techniques to assess various blood flow related parameters.

Background

Mechanical circulatory support (MCS) systems are used to unload the burden on a patient's heart by contributing to cardiac output with a pump mechanism. For example, if the patient's heart is at risk of or is insufficiently perfusing the patient's organs, an MCS system can be used to raise cardiac output to a more desirable level. Cardiac output is a desired value for clinical evaluation of the patient's state of health as well as function of the mechanical circulatory support device. In the context of mechanical circulatory support devices, the cardiac output is composed of the natural output provided by the heart in addition to the output of the pump. A degree of support may be described as the proportion of the volume flow conveyed by the pump of the support system to the total volume flow of blood from the ventricle to the aorta. The cardiac output or the total volume flow from the ventricle to the aorta is therefore usually the sum of the pump volume flow ($Q_P$) and the aortic valve volume flow ($Q_A$).

An established approach for measuring the pump volume flow ($Q_p$) is the correlation from the operating parameters of the support system, especially the electrical power consumed by an MCS's electrical motor, possibly supplemented by other physiological parameters such as blood pressure. An example of this established approach is disclosed in U.S. patent Ser. No. 10/765,791. However, measurement by the motor current draw or power consumption is flawed as it can only be an indirect measurement. However, in the established model, effects of the viscosity of the medium or pressure head need either be determined externally or via models which only can approximate the true flow rate. Furthermore, increases or decreases of the motor current are always influenced by a multitude of parameters such as wear, heart volume, pressure head, suction events, or viscosity.

The integration of dedicated ultrasound or temperature measurement technology into a support system for measuring pump volume flow has previously been proposed by Kardion GmbH in DE102014221495, WO2020064707, WO2019234163, WO2019234164, WO2019234166, WO2019229220, WO2019234146, WO2019234149, WO2019234151, WO2019234152, and WO2020030686. However, flow measurement from ultrasound doppler or thermal techniques may require the transmission of analog or digital signals through conductors that are in close proximity to conductors that provide power to a pump motor, which may potentially cause degradation of the signals or prevent a measurement altogether.

The integration of dedicated electrical impedance measurement technology into a support system for measuring ventricular volume or pump volume flow has previously been proposed by Kardion GmbH in WO2019234148, WO2019234148

Blood flow rate may also be used in the calculation of blood viscosity, which may be a clinically relevant measure, for example, as described by Kardion GmbH in WO2019234167, and WO2019234169.

Blood flow rate may also be used in the assessment of device wear or functionality for example as described by Kardion GmbH in WO2019243582.

All publications and patent applications mentioned in this specification are herein incorporated by reference to the same extent as if each individual publication or patent application was specifically and individually indicated to be incorporated by reference.

There remains a need for heart pump systems that accurately and reliably measure cardiac output, which may include output of the pump, natural output, or a combination of both.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for mechanical circulatory support systems.

The following disclosure describes non-limiting examples of some embodiments of mechanical circulatory support devices. For instance, other embodiments of the disclosed systems and methods may or may not include the features described herein. Moreover, disclosed advantages and benefits can apply only to certain embodiments and should not be used to limit the disclosure.

Systems and methods described herein relate to an improved cardiac support system and an improved method for operating a cardiac support system. In some examples, systems and methods described herein may be used to control or set a pump speed in a cardiac support system to, for example, a predetermined value.

In some examples, a cardiac support system may include a pumping device for moving the body fluid, such as blood. A pumping capacity of the pump device may be adjusted by using an adjustment signal. Furthermore, the cardiac support system may include a measuring device for measuring a flow rate of the body fluid. The measuring device can include at least one light source for emitting a light beam and at least one sensor element for detecting a reflected partial beam of the light beam. The measuring device may be designed to provide a measuring signal representing the flow velocity by using the reflected partial beam. In some examples, the cardiac assist system can additionally include a determination device configured to provide the adjustment signal based on the measurement signal.

In some examples, the cardiac support system may also be referred to as a heart pump, which may be configured to regulate a patient's blood flow. In some examples, the body fluid referred to herein can be the blood of a patient. However, systems and methods described herein may be applied to other fluids. The pumping device can be designed, for example, to adapt the pumping power of a cardiac support system to a heart rate. The measuring device may be designed to measure a current flow rate of the body fluid, for example, by means of a Doppler method. The sensor element may be a detector.

According to one example, the pumping equipment can have a pumping element and a pipe element. The pumping element can, for example, include a pump wheel. The pipe element can, for example, be shaped as a hose through which the body fluid may be pumped using, for example, the pump element. According to a design, a light source and, additionally or alternatively, a sensor element can be located at a pump outlet or at a pump tip of the pump element. This means that the sensor element can, for example, be arranged in a marginal area of the pumping equipment. It may be advantageous to place the sensor element in an area where there is a large flow, for example to avoid cell formation on the sensor element.

Furthermore, the light source and additionally or alternatively the sensor element can be located in the tubular element or at one end of the tubular element. The light source can be designed as a laser diode, for example. This minimizes scattering of the light beam.

According to one design, the measuring device can be designed as an LDV sensor. Advantageously, the measuring device can thus be designed as an optical sensor. The measuring device can be configured in some examples to determine the measurement signal using a Doppler shift or interference between the reflected partial beam and another beam. Depending on the design, the further beam can include a reflected beam or an unreflected beam. For example, a reference beam can be used as an unreflected beam.

According to some examples, the cardiac support system can be an additional measuring device for measuring the flow rate of the body fluid. The additional measuring device may have at least one light source that may be separate from a light source of the primary measuring device for emitting a second light beam and at least one sensor element that may be separate from the at least one sensor element of the primary measuring device for detecting a second reflected partial beam of the second light beam. The additional measuring device may be designed to detect the second reflected partial beam of the further light beam by using the second reflected partial beam to provide an additional measurement signal representing the flow rate. In some examples, the cardiac assist system may include an additional determination device configured to determine a setting signal using the additional measurement signal. The primary measuring device and additional measuring device may, for example, be configured to function in a similar or different manner and/or may be arranged near or further away from each other. For example, the primary and additional measuring device can be arranged adjacent to each other.

In some implementations, a method for operating the cardiac support system can include a plurality of steps, which may optionally include but are not limited to, a step of emitting a light beam, a step of detecting a reflected beam of the light beam, a step of providing a measurement signal representing the flow velocity using the reflected partial beam, and a step of determining and providing an adjustment signal using the measurement signal to produce an adjustment of the pumping capacity of the pump unit. The method can advantageously be used to operate a cardiac support system. In some examples, an adjustment of the pump equipment, such as by the methods described herein, can be fully or partially automated or performed manually.

In one aspect a mechanical circulatory support (MCS) device comprises an impeller housing, an inlet cannula connected to a distal end of the impeller housing, and an optical fiber. The impeller housing comprises a first bearing arm connected to a bearing positioned at the central axis of the impeller housing, the first bearing arm comprising a bore, wherein a distal portion of the optical fiber is held in the bore.

There are various embodiments of the above and other aspects. For example, the device may comprise at least a second bearing arm. The first bearing arm may have a thickness thicker than the at least a second bearing arm. The first bearing arm may have a thickness of about 0.4 mm or greater. The second bearing arm may have a thickness of about 0.2 mm. The optical fiber may in part pass along an exterior surface of the impeller housing. The optical fiber may be configured to be positioned along a spline of the impeller housing. The bore may have an inner diameter in a range of 0.20 to 0.30 mm. The bore may have an inner diameter comprising about 0.23 mm. The bore may be at an angle with respect to the central axis of the impeller housing in a range of 10 to 20 degrees. The bore may be at an angle of above 15 degrees. The distal portion of the optical fiber or the bore may be aimed into a flow lumen of the inlet cannula. The distal portion of the optical fiber or the bore may be aimed at the central axis. The distal portion of the optical fiber or the bore may be aimed to the side of the central axis. A distal end of the optical fiber may be positioned flush with a surface of the first bearing arm.

In another aspect, a cardiac assist system comprises a pump component, a measuring device, and a determination device. The pump component is configured to move body fluid of a patient, where a pumping capacity of the pumping component is adjustable using an adjustment signal. The measuring device is configured to measure a flow rate of the body fluid. The measuring device comprises at least one light source configured to emit a light beam, and at least one sensor element configured to detect a reflected partial beam of the emitted light beam. The measuring device is configured to generate a measurement signal based at least in part on the reflected partial beam and a flow rate of the body fluid. The determination device is configured to determine the adjustment signal based at least in part on the measurement signal.

There are various embodiments of the above and other aspects. For example, the pump component may comprise a pumping element and a tubular element. The light source or the sensor element may be arranged at a pump outlet or at a pump tip of the pump element. The light source or the sensor element may be disposed in the tubular element or at a tube end of the tubular element. The measuring device may be configured to operate as an LDV sensor. The measuring device may be configured to generate a measurement signal using a Doppler shift or a detected interference between the reflected partial beam and another beam. The cardiac assist system may comprise a second measuring device configured to measure the flow rate of the body fluid, the second measuring device comprising at least one second light source configured to emit a second light beam, and at least one second sensor element configured to detect a further reflected beam of said second emitted light beam, where said second measuring device is configured to provide a second measuring signal representing the flow velocity of the body fluid using said further reflected partial beam, and where said second measuring device is configured to determine the adjustment signal by using the further measuring signal.

In another aspect, a method for operating the cardiac assist system comprises outputting a light beam; detecting a reflected partial beam of the light beam; providing a measurement signal representing the flow velocity using the reflected partial beam; and determining an adjustment signal using the measurement signal to adjust a pumping capacity of a pumping device of a cardiac assist system.

Any of the disclosed examples, aspects, or features described herein may be combined in whole or in part. In some examples, the methods described herein may be applied in whole or in part by one or more aspects of any of the systems or devices described herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated and make part of this disclosure.

FIGS. 8 and 9A, 9B are side and cross-sectional views of an example MCS device adapted to emit a laser from a distal end into an inlet tube of the device.

DETAILED DESCRIPTION

Figure 1:
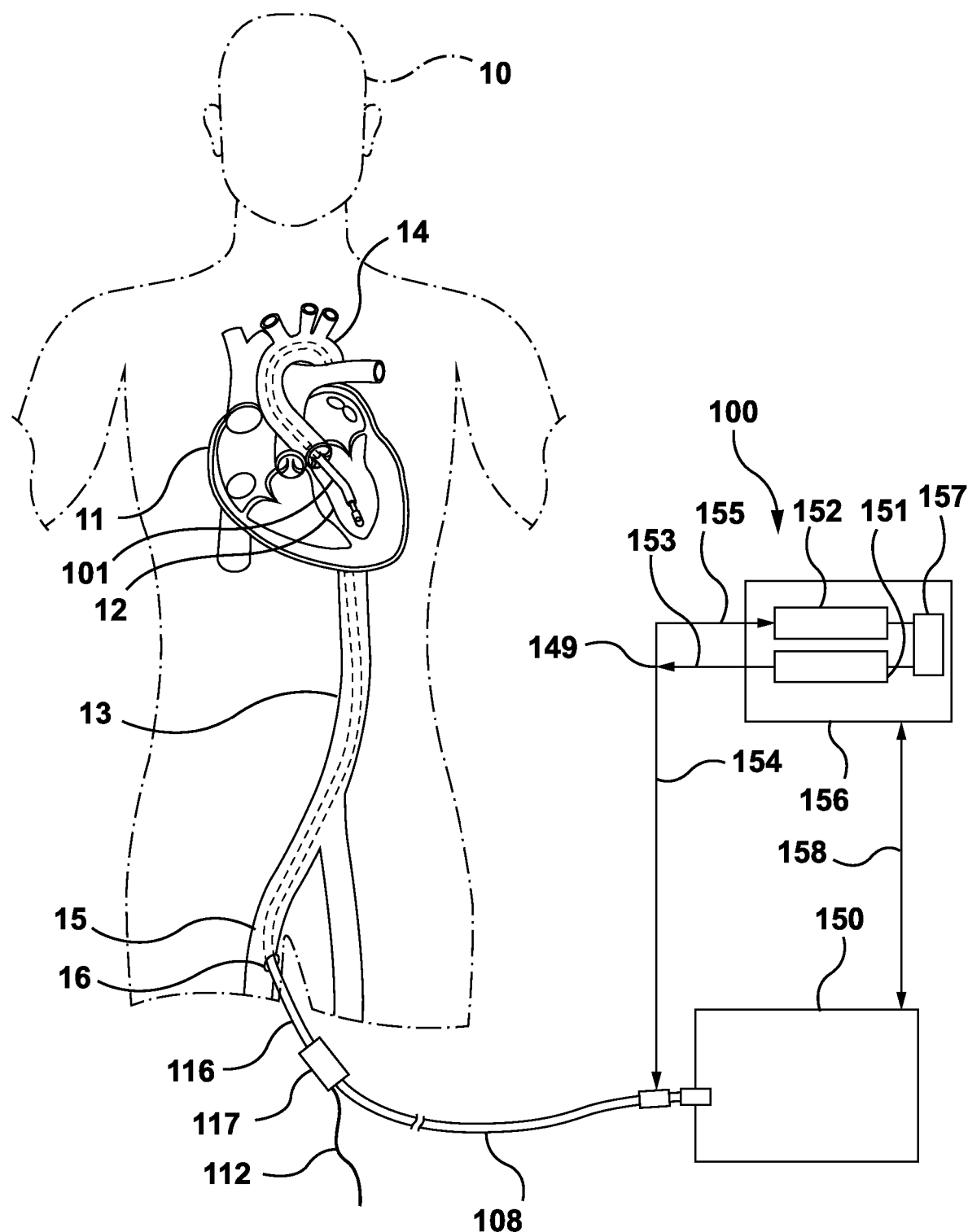
FIG. 1 is a schematic illustration of an example mechanical circulatory support system configured to measure volumetric flow rate of blood using laser doppler velocimetry (LDV).

The disclosure herein is related to mechanical circulatory support systems with components for conducting laser doppler velocimetry to measure volumetric flow of blood, for example, through a mechanical circulatory support (MCS) device or through the aortic valve around an implanted MCS device. In some examples, systems and methods described herein may be used to control or set a pump speed in a cardiac support system, such as an MCS device, to, for example, a predetermined value.

The following detailed description is directed to certain specific embodiments. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings.

Example Laser Doppler Velocimetry Techniques

Laser Doppler velocimetry (LDV) is the technique of using the Doppler shift in a laser beam to measure the velocity in transparent or semi-transparent fluid flows. The general technique of LDV involves directing coherent light towards particles whose velocity is to be measured. The light is scattered by the particles to be measured and experiences a Doppler (or frequency) shift. The frequency shift depends on the velocity vector of the particles and the light propagation direction. The scattered light can interfere with light reflected by immobile objects, such as the edge of a fiber configured to direct the coherent light. As a result, a pulsation is observable in a photodiode capturing this light. The pulsation has a frequency as large as the Doppler shift. A frequency spectrum of the pulsations, such as a power spectrum, is calculated from the amplified and numerically converted time dependent photodiode signal by standard Fourier analysis, or other known numerical techniques. From this frequency spectrum, a velocity or velocity distribution can be obtained. For flow in a pipe, the velocity is related to the volume flow. The flow in a pipe may serve as an approximation to an inlet cannula of the MCS device.

One form of laser Doppler velocimetry crosses two beams of collimated, monochromatic, and coherent laser light in the flow of the fluid being measured. The two beams can be obtained by splitting a single beam of light, thus ensuring coherence between the resulting two collimated beams. Lasers with wavelengths in the visible spectrum (390-750 nm) may optionally be used, allowing the beam path to be observed. For example, one or more lasers that can be used in an LDV system may include, but are not limited to He—Ne, Argon ion, or laser diode. Transmitting optics may focus the beams to intersect at their waists (or the focal point of a laser beam), where they interfere and generate a set of straight fringes. As particles in the fluid (e.g., blood cells) pass through the fringes, the particles reflect light that is then collected by receiving optics and focused on a photodetector (e.g., a camera). The frequency of fluctuations in intensity of the reflected light is equivalent to the Doppler shift between the incident and scattered light and is thus proportional to the component of particle velocity which lies in the plane of two laser beams. If the sensor is aligned to the flow such that the fringes are perpendicular to the flow direction, the electrical signal from the photodetector will then be proportional to the full particle velocity.

Another form of laser Doppler velocimetry, has an approach akin to an interferometer. The sensor also splits the laser beam into two parts; one (the measurement beam) is focused into the flow and the second (the reference beam) dies not pass through the flow but is sent to a photodetector. A receiving optics provides a path that intersects the measurement beam, forming a small volume. Particles passing through this volume will scatter light from the measurement beam with a Doppler shift; a portion of this light is collected by the receiving optics and transferred to the photodetector. The reference beam is also sent to the photodetector where optical heterodyne detection produces an electrical signal proportional to the Doppler shift, by which the particle velocity component perpendicular to the plane of the beams can be determined.

It is possible to apply digital techniques to the signal to obtain the velocity as a measured fraction of the speed-of-light.

In another approach of laser Doppler velocimetry, a single laser beam is emitted into blood flowing through a space of known dimensions (e.g., an inlet tube of an MCS device). The light gets scattered off of moving blood cells. The scattered light experiences a Doppler (or frequency) shift, which approaches zero if the velocity of blood and the k-vector of light are perpendicular and has a maximum if the velocity of blood and the k-vector of light are aligned parallel to each other. The light scattered off of moving blood cells can interfere with light scattered off of immobile objects, such as the edge of a fiberoptic or the edge of an inlet tube of an MCS device. As a result, an interference pulsation is observable in a photodiode capturing the scattered light. Captured light may be directed through a receiving optical fiber that passes through a catheter of the MCS device to a photodiode in an LDV module external to the patient. The receiving optical fiber may be a different fiber than the transmitting fiber in which case the receiving fiber sends the received light to a photodiode. Alternatively, a single transmitting and receiving fiber may direct received light back to a laser source where the laser is modulated. Alternatively, such as illustrated in FIG. 1, the receiving fiber for collecting backscattered light can be the same fiber as the transmitting fiber. In the illustrated example, a Y-splitter 149 may be incorporated into a cabling system that may be external to the patient's body. The Y-splitter 149 may be configured to passively separate transmitted light from received light and direct the received light to a photodiode 152, which may be done, for example, with a one-way mirror. Advantageously, this Y-splitter configuration may have a benefit of being passive and simpler than the other configurations. The pulsation has a frequency directly corresponding to the Doppler shift. The pulsation frequency can be obtained, for example, by standard Fourier analysis. From this frequency, a velocity or velocity distribution can be obtained. With a known diameter of the space (e.g., inlet tube or blood vessel) in which the measurement takes place, the volumetric flow rate can be obtained.

With the use of a laser Doppler velocimetry technique, one can directly measure the velocity of the blood and with the defined size of the inlet tube, a precise measurement of the volume flow within the MCS Device is possible. The collected signals (e.g., electromagnetic waves or light waves) can be transmitted via optical fibers. Advantageously, the optical fibers help avoid the distortion of electrical signals by environmental influences, such as the motor drive current, mechanical vibrations of the motor, or other electrical signals, which may be disadvantageous in measuring blood flow rate in an MCS device by means that require transmission of electrical signals.

It shall be understood that for the various configurations and embodiments disclosed herein there can be one or more optical fibers that can be single or multicore and the optical fibers do not need to be continuous between the controller and the device but can be joined together with standard optical fiber connections. Laser light may be transmitted having various wavelengths or power.

Example MCS Device Configuration

FIG. 1 shows a schematic illustration of an MCS system 100 configured to measure volumetric flow rate of blood flowing through, and/or around, an MCS device 101 implanted at least partially in a patient's heart 11 (e.g., an inlet portion of the MCS device may be positioned in a left ventricle 12 and an outflow portion of the MCS device may be positioned in the aorta 13) and optionally delivered and connected through the natural vasculature (e.g., via access at a femoral artery 15, or other vascular access point such as a carotid a., subclavian a., radial a.). The connection through the natural vasculature may be via a catheter 116. The catheter 116 may be configured to include some combination of communication components, such as electrical conductors and laser conductors (e.g., optical fibers, coaxial optical fibers, single core optical fibers, multicore optical fibers) and, optionally, a guidewire lumen through which a guidewire 112 may be positioned to assist placement of the MCS device or other catheterization steps. The catheter 116 may have a proximal hub 117 that optionally has a guidewire outlet in communication with the guidewire lumen, and a connector configured to connect a connecting cable 108.

In the illustrated example, the connecting cable 108 is shown connecting the catheter 116 of the MCS device 101 implanted in the body to a control console 150 located outside the body 10. The control console 150 contains or communicates with an LDV module 156 which is comprised of a laser source 151, a photodiode 152 and electronics to drive both and a data evaluation module 157, for example, one or more hardware processors or an FPGA. The LDV module 156 may be a separate system component that is not physically contained in the control console 150. In some examples, fiber optics may connect the LDV module 156 to fiber optics in the connecting cable 108. The LDV module may be configured to communicate with the control console 150 via a communication link 158, such as a connecting cable or wireless connection. In one embodiment, a single fiber optic 154 runs through the connecting cable 108 and may be connected to a laser source 151 and a photodiode 152 by a Y-splitter 149. The fiber 154 may be split into a source fiber 153 and a return fiber 155 by the Y-splitter 149. In some examples, one or more laser delivery fibers and one or more return fibers may be incorporated into the connecting cable 108. In some examples, the LDV module is contained and integrated in the control console 150.

Figure 2:
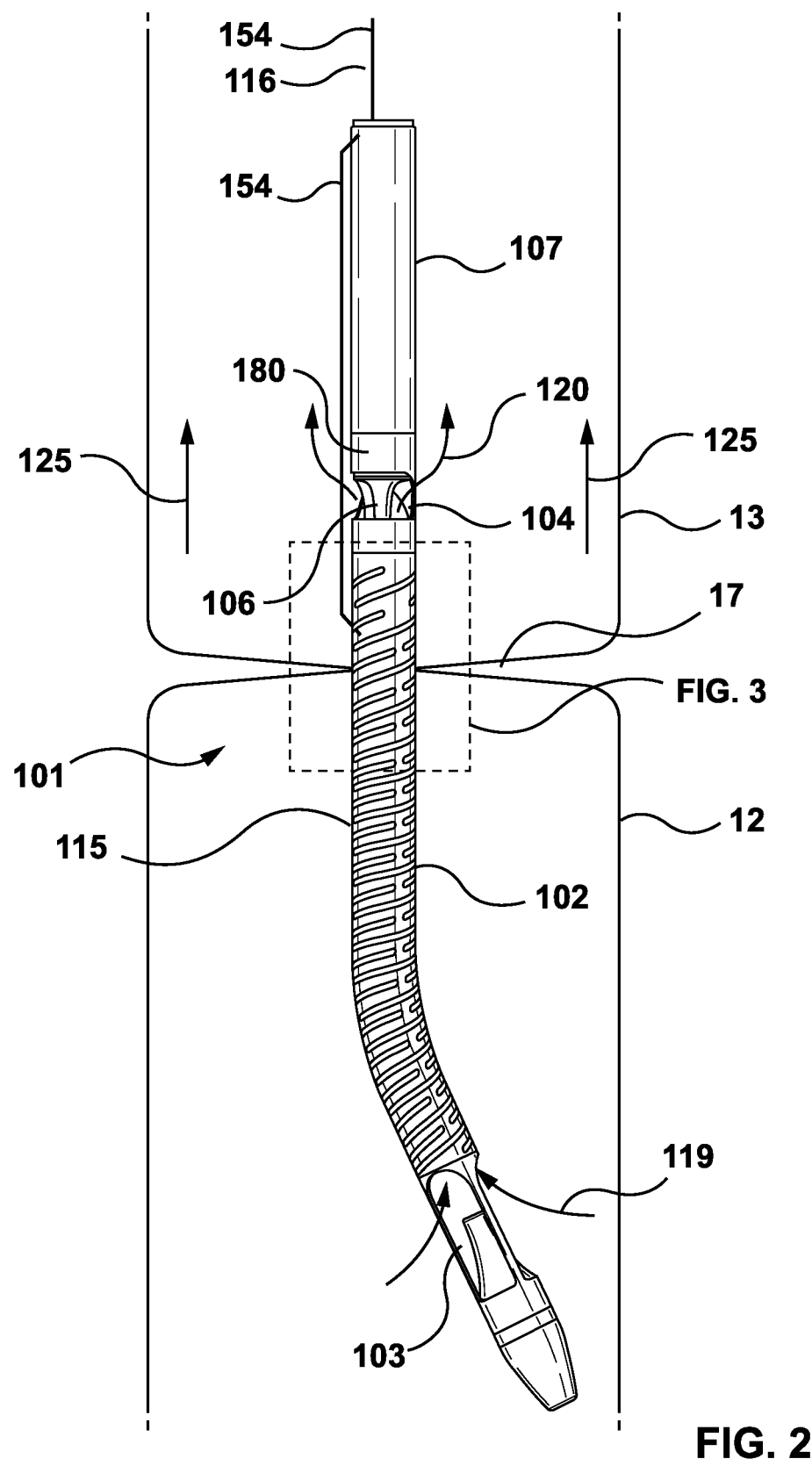
FIG. 2 is a schematic illustration of an example mechanical circulatory device in situ configured for LDV of blood flowing through the device.

FIG. 2 shows a closer view of the example MCS device 101 of FIG. 1 that may implanted in the patient's heart 11 and aorta 13. The MCS device 101 is shown placed across the aortic valve 17 via a single femoral arterial access (see FIG. 1). The MCS device 101 may include a low-profile axial rotary blood pump 115 mounted on a catheter 116. The catheter 116 may have a smaller outer diameter (e.g., in a range of 6 Fr to 12 Fr, preferably 8 Fr) than the MCS pump 115 (e.g., in a range of 12 Fr to 21 Fr, preferably 14 to 18 Fr). When in place, the MCS pump can be powered, for example, by the MCS controller 150. The MCS controller 150 may be configured to turn a motor 107 in the MCS pump 115. The motor 107 may be configured to turn an impeller 106 that draws blood through an inlet cannula 102. In some examples, the motor 107 may be an axial rotary motor. Blood enters the inlet cannula 102 from a first anatomical location, such as the left ventricle 12, through inlet windows 103 as shown by flow arrows 119 and leaves the inlet cannula through outlet windows 104 as shown by flow arrows 120 to a second anatomical location, such as the aorta. The MCS pump may provide a flow of blood to at least partially support the natural function of the anatomy such as the patient's heart or components of the heart such as the left ventricle. The flow of blood may be in a range of up to and including approximately 6.0 liters/minute (e.g., up to 4.0 liters/minute). The volumetric flow rate of blood flowing 118 through the inlet cannula 102 is of particular clinical interest and is a target measurement of the proposed LDV system. Optionally, an LDV system may measure the volumetric blood flow 125 through a portion of the patient's vasculature around the MCS pump in addition or alternative to flow 118 in the inlet cannula.

The inlet cannula 102 may be adapted to be elastically flexible so it can pass through vascular bends during delivery and removal yet return to its unconstrained shape when placed in a target anatomy. The inlet cannula 102 may also have sufficient hoop strength to resist collapsing when the impeller is activated to draw blood through the inlet cannula. For example, the inlet cannula may be made from a laser cut elastically flexible tube 123 (e.g., made from Nitinol) with a flexible membrane layer 124 to seal the laser cuts and allow blood to flow only through the inlet windows 103 or the outlet windows 104. An optical fiber 154 may be positioned in the catheter 116 and may be connected to the LDV module via an optional extension cable and connectors. Optionally the optical fiber 154 may terminate at a connection module located between the catheter 116 and MCS pump 115 and a separate fiber 154' may connect to the connection module and continue to light transmission position, for example in the inlet cannula, to facilitate manufacturing. For simplicity, in FIGS. 2, 6, 7 and 8, the optical fiber 154' is shown schematically. Optical fibers may be firmly connected to the MCS pump 115 for example with adhesive, embedded in a substrate layer that is glued to the surface of the MCS pump, contained under a membrane layer 124 surrounding a structural layer 123 (see FIG. 5C), or passing through a lumen or channel in the MCS pump. For example, one or more optical fibers may be connected to the exterior surface of the housing of the motor 107, an outflow strut 121 that partially defines an outflow window 104, and along the inlet cannula 102, optionally in a coiled pattern that follows the pitch of laser cuts, which may allow the inlet cannula to remain flexible. An example of a pathway for a fiber optic is shown in FIG. 8, wherein the distal end of a fiber 154' terminates in a distal nose piece 114. Optionally, the distal end of a fiber 154' may terminate in other locations such as within the inlet cannula 102 between the inflow windows 103 and the outflow windows 104, optionally distal to the impeller 106.

Figure 3:
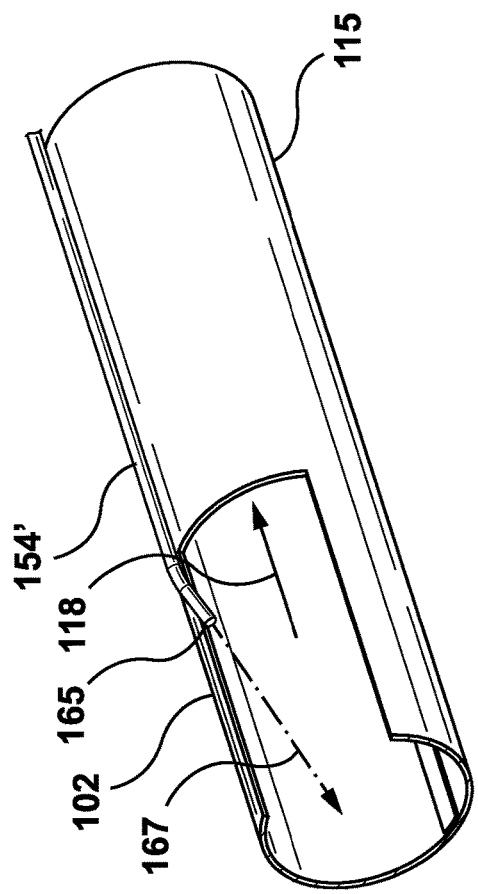
FIG. 3 is a cutaway view of a section of the device of FIG. 2.

A cutaway closeup view of a portion of the inlet cannula 102 of FIG. 2 is shown in FIG. 3, wherein the inlet cannula 102 is simplified and shown as a solid cylindrical tube. FIG. 3 illustrates a configuration of and LDV system having a single optical fiber 154' integrated in to the MCS pump. The distal terminating tip 165 of the fiber 154' directs a laser beam provided by the laser source 151 into a lumen within the inlet cannula 102, which may be at a known angle in relation to the inlet tube's central axis 166 or tubular wall or a particular region of flow through the inlet tube. Optionally, the laser may be aimed at or through a region of flow within the inlet tube that is modeled to have a particular flow characteristic such as laminar flow, average flow, maximum flow, or turbulent flow. Optionally, turbulence may be created or manipulated in a region of flow where the laser is aimed to produce sufficient backscatter, which may be particularly beneficial if a terminal end of the optical fiber is positioned in the device in a location where flow is too laminar to cause sufficient backscatter. For example, one or more flow affecting features may be positioned on the device upstream of the focal region such as in the inlet tube or in the inlet windows. Optical fibers, typically made of glass, have a minimum bending radius (e.g., 10 mm for a fiber having a diameter of about 245 micrometers), which may be a factor in how the distal terminating tip of the fiber optic is configured inside the tube. For example, the tip of the fiber 165 may be formed such that the flow 118 inside the cannula is not sufficiently disturbed and no sharp edges are present to sufficiently affect fluid flow or hemolysis. The tip 165 of the fiber may be shaped or have a shaped component connected to it that is chosen (e.g., with the assistance of fluid modeling and bench tests) to minimize its effect on hemolysis or pump efficiency).

Figure 5B:
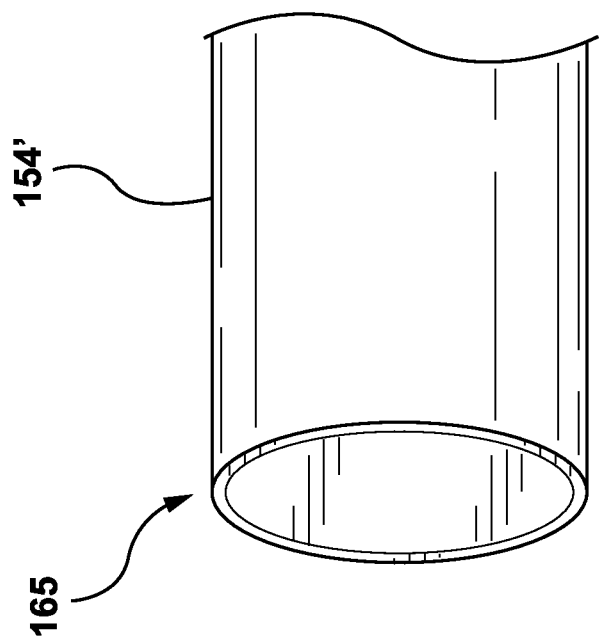
FIGS. 5A and 5B are views of various embodiments of a terminal end of an optical fiber that may be part of an example mechanical circulatory support system.
Figure 5A:
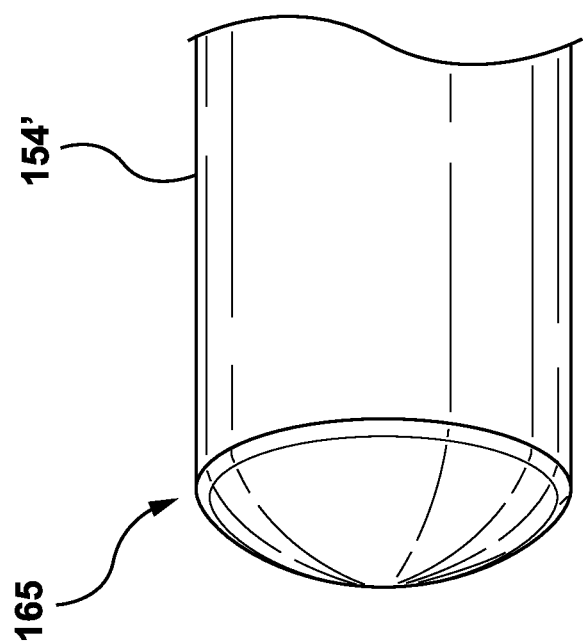
Figure 5C:
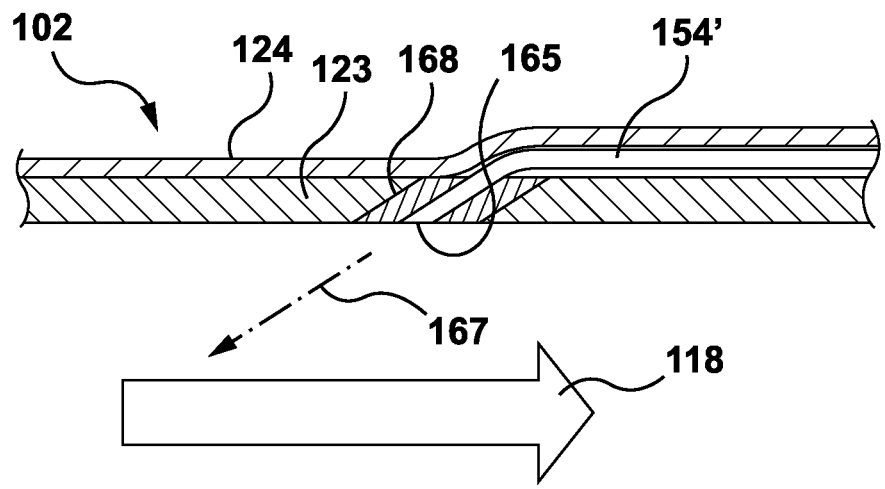
FIGS. 5C, 5D, and 5E are close up views of various embodiments of a terminal end of an optical fiber positioned in a wall of a mechanical circulatory support device.
Figure 5D:
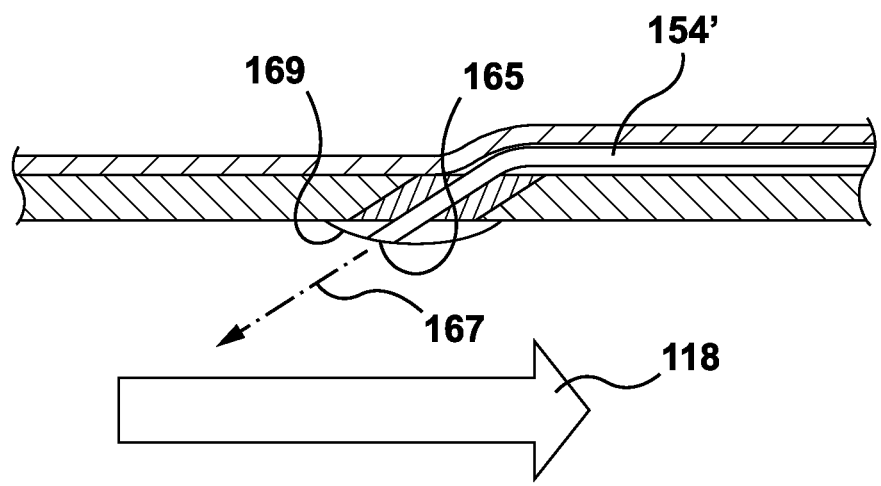
Figure 5E:
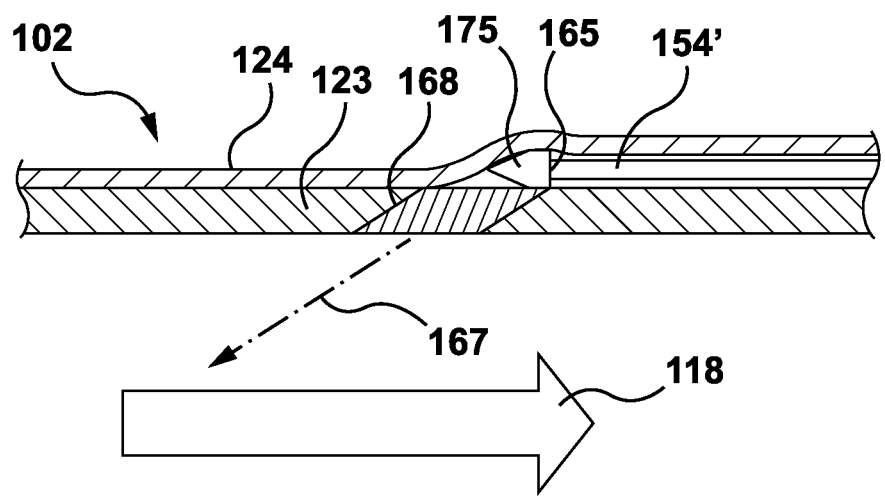

Some examples of optical fiber tips 165 that direct a laser into an inlet cannula are shown in FIGS. 5A to 5E. FIG. 5A shows a fiber tip 165 that is rounded in a hemispherical surface. Optionally, even the optically insulating sheath of the fiber can have a cross sectional cut that is smoothed or angled to reduce sharper edges. FIG. 5B shows a fiber tip 165 that is flat and perpendicular to the axis of the fiber. FIG. 5C shows an optical fiber 154' held to an inlet cannula 102, for example between the structural layer 123 and membrane 124. The tip 165 of the fiber may be directed through an aperture 168 formed at a desired angle to direct the laser beam 167 into the blood flow 118 in the inlet cannula 102. The tip of the fiber may be cut and positioned flush with the inner surface of the inlet tube. Optionally, the fiber may be potted in the aperture. FIG. 5D shows an alternative method of terminating a fiber aimed into an inlet tube, wherein the tip of the fiber 165 is flush with or contained in a flow diverter 169 that smoothens any irregularity to the inner surface caused by protrusion of the fiber or component of the LDV system into the inlet cannula. A flow diverter 169 may be made with UV curing silicon or molded plastic or glass, for example. Optionally a flow diverter may also act as a prism or lens to modify the laser beam. FIG. 5E shows another arrangement of a distal end of an optical fiber 165, wherein the fiber 154 is not bent to pass through the tube wall 123 but is connected to a microoptic 175 that bends the light, sending it through an aperture 168 in the tube 123. Optionally, the aperture 168 may be filled with a translucent material to the aperture that is configured to minimally affect the flow of blood.

Figure 5F:
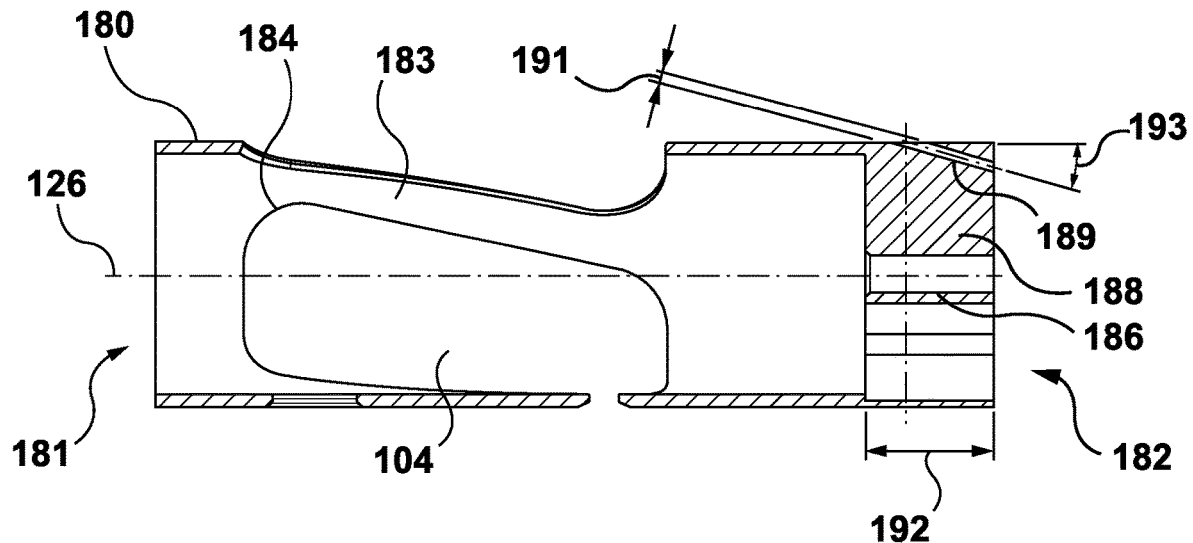
FIG. 5F is a longitudinal cross-sectional view of an impeller housing having an optical fiber mounting lumen.
Figure 5G:
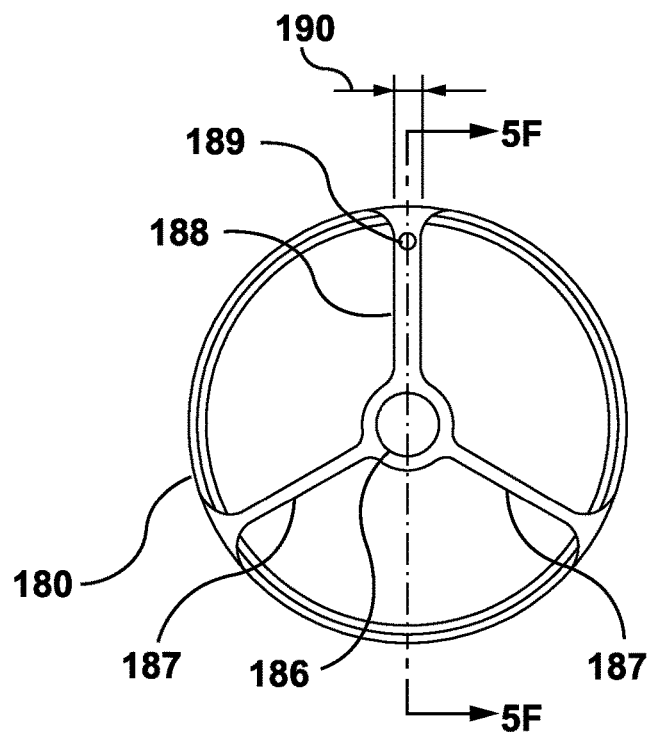
FIG. 5G is an axial view of the distal end of the impeller housing shown in FIG. 5F.

Additionally or alternatively, a distal tip of an optical fiber may be positioned in an impeller housing 180 as shown in FIG. 5F, showing a cross sectional side view, and FIG. 5G, showing a distal view. The impeller housing 180, such as shown in FIG. 2, may be a machined metallic component connected on its proximal end 181 to the housing of the motor 107 and on its distal end 182 to the inlet cannula 102. The impeller housing 180 may have outlet windows 104 (e.g., 3 to 5 outlet windows). Each outlet window may be separated from one another by impeller housing struts 183. The struts 183 can be configured to provide rigid structural strength and resist bending. Optionally, as shown, the splines may be angled with respect to the axis 126 in a range of, for example, 0 to 30 degrees. The splines may have rounded corners 184, or may have rounded, chamfered, or electropolished edges, which may contribute to reduction of hemolysis. The impeller 106 may be positioned within the impeller housing 180 creating a hydrodynamic force that moves fluid through the inlet tube and ejects the fluid out through the outlet windows. The impeller housing 180 can include a bearing 186, e.g., a journal bearing, that radially contains a journal on a distal end of the impeller. The bearing 186 is held in the center of the impeller housing by one or more bearing arms 187 (for example, 3 arms). One arm 188 of the plurality of bearing arms 187 may be used to contain an aperture 189 through which a laser fiber 154 may be positioned and aimed into a fluid flowing within the inlet cannula 102. Since the bearing arm 188 may have a greater thickness than the wall of the inlet tube (such as inlet tube 123 shown in FIG. 5C), this configuration may be more robust and may hold the fiber more securely than configurations where the fiber aperture is arranged in the inlet cannula structural wall 123. A fiber aperture in the arm can beneficially position the distal tip of the fiber further into the flow, closer to the high velocity components of flow and the field of view of the fiber is mainly along the flow direction. Furthermore, mechanical stress on the fiber may be much less due to the relative stiffness of the housing compared to the inlet tube. Therefore, risk of damage or erroneous measurements can be mitigated.

To accommodate the fiber aperture 189, the arm 188 may have a thickness 190 that is thicker than the other bearing arms (e.g., twice as thick as other bearing arms, having a thickness of 0.40 mm compared to 0.20 mm thickness of the other bearing arms). The bearing arms 188 may have a length 192 in a range of 2.2 to 3.5 mm (e.g., about 3.0 mm). The fiber aperture 189 may have an inner diameter 191 in a range of 0.20 to 0.30 mm (e.g., about 0.23 mm) and be at an angle 193 with respect to the outer surface of the housing 180 in a range of 10 to 20 degrees (e.g., about 15 degrees) so the distal tip of the fiber is aimed into the inlet cannula. Optionally, the fiber aperture may be curved, which may be accomplished by electrical discharge machine (EDM) drilling with a curved electrode. The fiber aperture 189 may be aimed directly and the central axis 126 or alternatively may be aimed to a side of the axis. The distal end of the fiber may be flush with the surface of the bearing arm 188. The fiber may be positioned on the external surface of the housing, for example, along one of the impeller housing struts 183, particularly a strut that is aligned with the fiber aperture 189. Optionally, additional turbulence in the fluid may be created, for example, in the form of a bump on the inner surface of the inlet tube, in front of the fiber's distal tip to ensure high velocity particles are measured by the laser.

Figure 4:
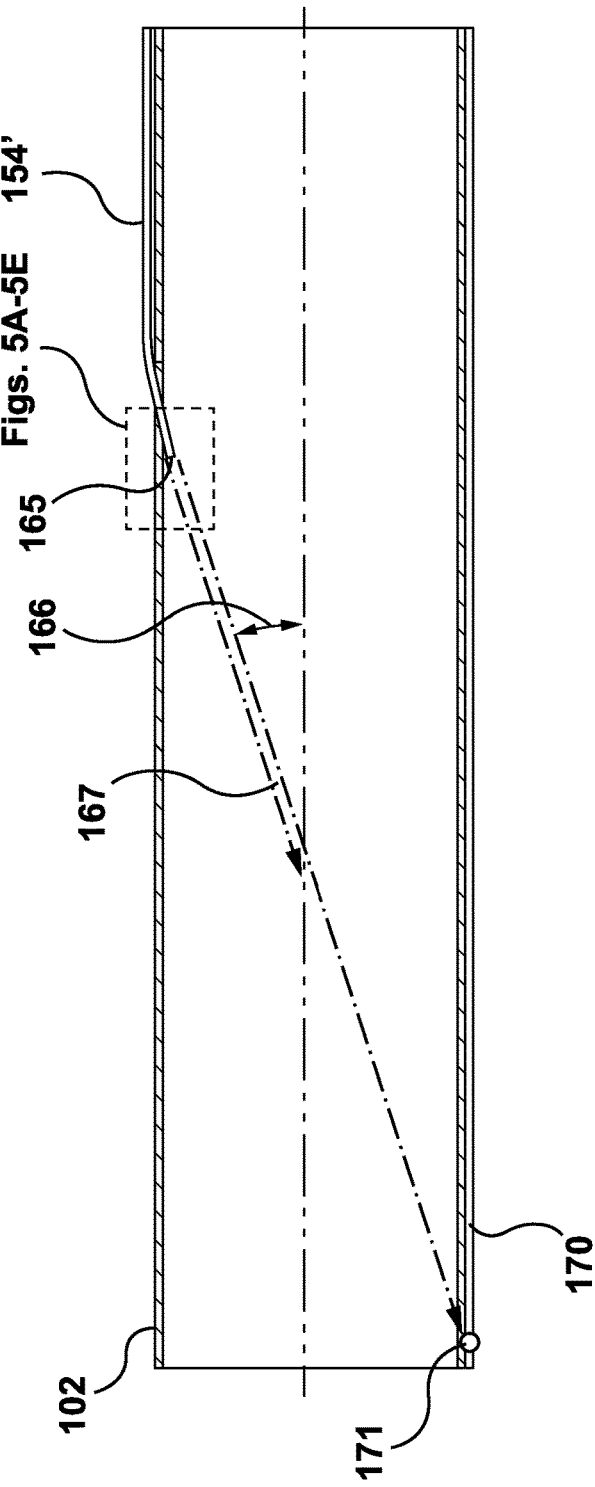
FIG. 4 is a cross sectional view of a portion of the device of FIG. 3.

FIG. 4 shows a cross sectional view of a portion of inlet cannula 102 of an alternative configuration having a transmitting optical fiber 154' and a separate receiving fiber 170. A second fiber optic acting as the receiving fiber optic 170 is positioned with its distal terminating tip 171 on an opposing side of the inlet cannula 102 in line with the transmitted laser beam 167. A micro-optic prism or lens connected to the distal tip 171 of the receiving fiber 170 may be used to reflect or amplify the received light into the receiving fiber 170. Alternatively, a distal tip 171 of a receiving fiber 170 may be positioned proximal to the distal tip 165 of a sending fiber 154' and a micro-optic prism or lens may be positioned with respect to the distal tip 165 of the sending fiber 154' to modify the direction of a beam emitted in a distal direction to aim it proximally toward the receiving fiber tip 171. When a second fiber 170 is incorporated, a y-splitter 149 is not required to separate the transmitted laser from the received light.

Figure 6:
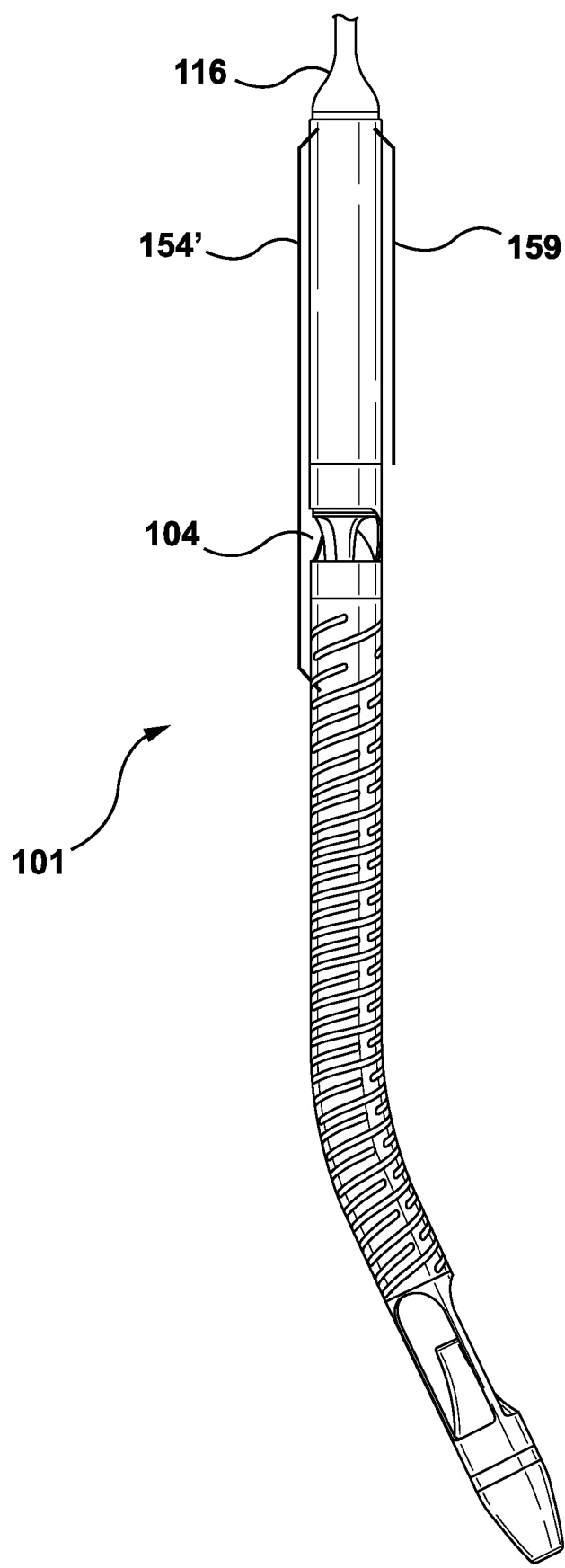
FIG. 6 is a side view of an example MCS device having a first fiber optic positioned to measure flow through an inlet tube and a second fiber optic positioned to measure flow around the device, where the second fiber optic is adapted to measure at least two velocity components.

Optionally or alternatively, an LDV measurement may be taken by a fiber directing a laser to an area in the vasculature around the MCS pump 101 or catheter 116, for example either proximal to the outlet windows 104 where blood flow includes a combination of both blood flowing through the inlet cannula 102 and blood flow driven by the pumping left ventricle through the aortic valve around the MCS pump; or distal to the outlet windows in a region occupied predominantly by blood flow driven by the pumping left ventricle through the aortic valve around the MCS pump. For example, a fiber 159 is shown in FIG. 6 with its terminating tip positioned proximal to the outlet windows 104. This may optionally be in addition to the fiber 154' aimed into the inlet cannula, wherein both the flow 118 through the MCS pump 101 and the flow external to the MCS pump, such as the flow 125 pumped by the left ventricle 12 through the aortic valve 17 or a combination of this and the flow 120 exiting the MCS pump, may be measured by the LDV module and displayed on a user interface for example as numerical data or in a plot vs time. Optionally, flow measurements in multiple locations or of multiple flow components may be used by an algorithm to generate warnings, alerts or procedural guidance to a user. For example, if the ratio of natural flow 125 to pumped flow 120 decreases over a period of time (e.g., one day) could generate a user message related to the patient's recovery or health status. Optionally, in a system having a LDV measurement taken proximal to the outlet windows and wherein the impeller is controlled to deliver continuous flow, an algorithm may determine how much of the flow is pulsatile compared to continuous. The pulsatile flow may represent the natural flow pumped by the left ventricle while the continuous flow may represent the flow pumped by the MCS device. The ratio of pulsatile flow to continuous flow over time may be an indicator of the patient's health or a factor in changing the flow rate of the MCS device. An increasing ratio may indicate a recovering heart while the opposite may indicate a worsening condition.

Optionally, flow data gathered by LDV measurements may be used to determine if the MCS device is positioned correctly with the outlet windows in the aorta and the inlet windows in the left ventricle. For example, while the pump is operating a measured pulsatility of flow may be compared to an expected pulsatility in flow. If it is lower than a threshold or percentage of the expected pulsatility the device may be positioned incorrectly, and a warning may be provided on the console.

Figure 7:
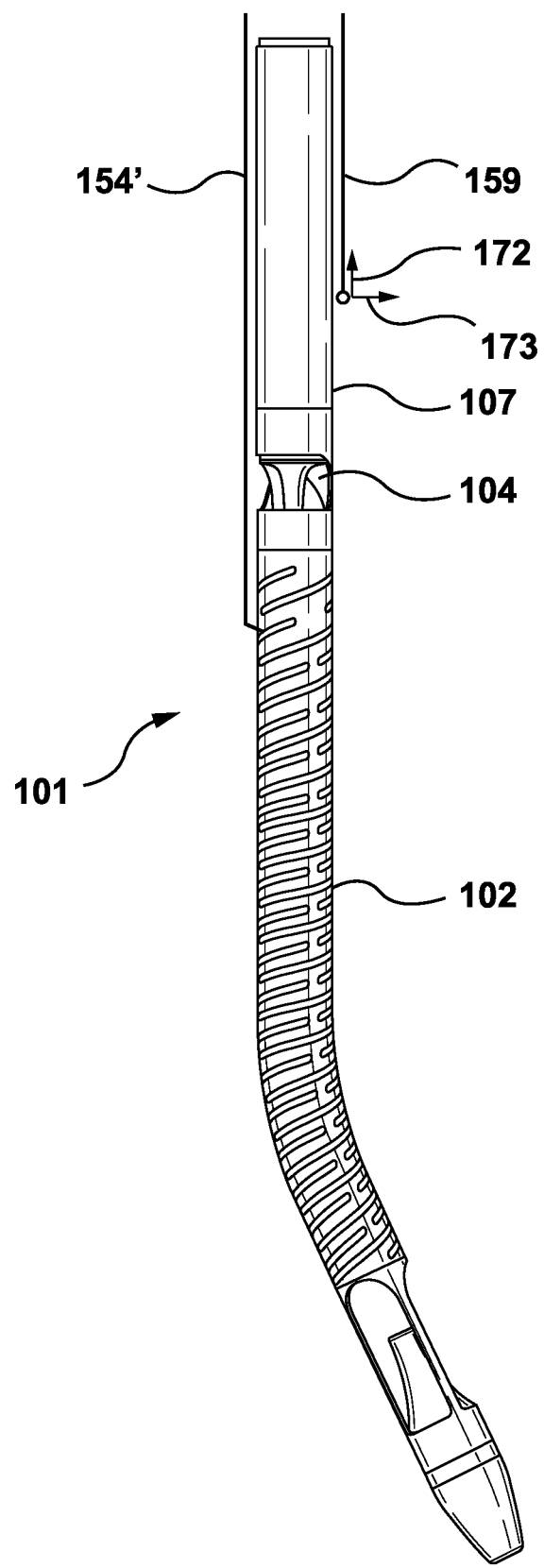
FIG. 7 is a side view of an example MCS device showing how one or more optical fibers may be connected to the MCS device and coiled around the inlet tube following the pitch of laser cuts in a structural component of the inlet tube.
Figure 8:
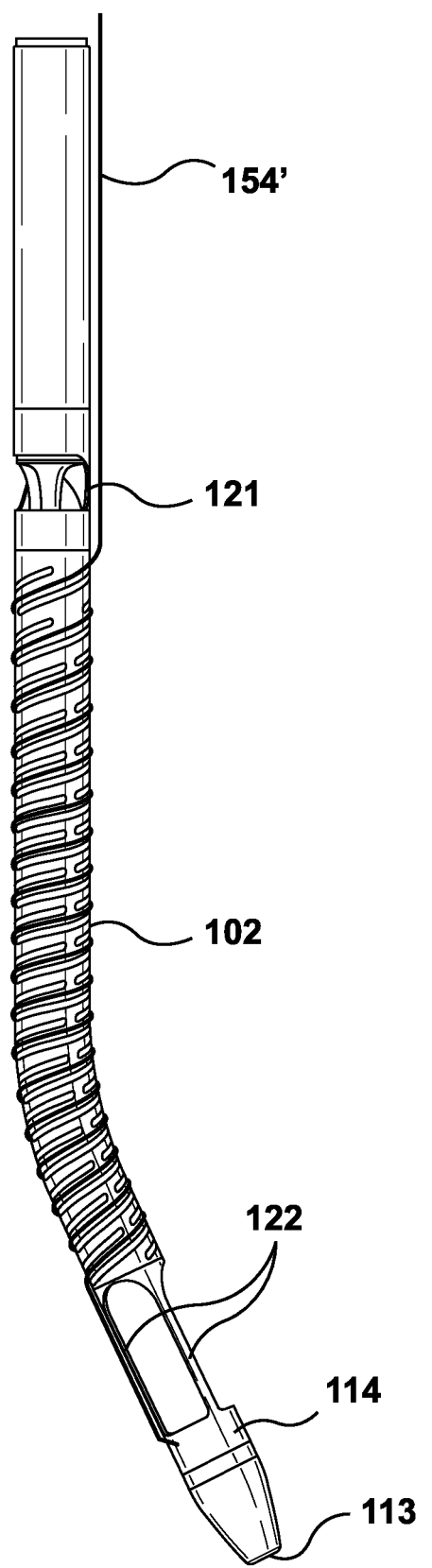

Optionally, as shown schematically in FIG. 7, an LDV measurement outside the inlet cannula and proximal to the outlet windows 104 may include measuring at least two velocity components: a linear velocity component 172 and a rotational velocity component 173. The linear velocity component 172 may be considered to be aligned parallel to the central axis of the MCS pump 101 or housing of the motor 107, or alternatively parallel to the central axis of the vessel (e.g., aorta) in which the measurement is taken. The rotational velocity component 173 may be considered to be tangential to the circumference of the MCS pump 101 or housing of the motor 107. Because the blood flow proximal to the outlet windows 104 during operation of the pump in a beating heart contains a large rotational component as well as linear component, measuring both components may allow a more accurate measurement of true blood flow. Optionally, an algorithm may calculate total blood flow summing these two components or summing factors of each component. Optionally an algorithm may monitor a ratio of the linear and rotational velocity components, which may be an indication of a ratio of natural blood flow vs pumped blood flow. The algorithm may monitor the ratio over time, which may be an indication of the patient's or device's status. Optionally, the two-component LDV measurement may be taken by splitting a laser emitted from one fiber using a prism that directs two beams at a known angle to one another, up to and preferably 90 degrees. For example, a first beam may be directed along a plane that is parallel to the axis of the device and a second beam along a plane transverse to the axis of the device.

Optionally, the calculated velocity or volumetric flowrate may be used as a feedback parameter in the control of the MCS device's impeller speed. For example, a control console may have an impeller speed control algorithm stored on an electronic storage medium contained within. The algorithm may accept a user selected input for a desired set flowrate and output a motor voltage to operate the motor that drives the impeller at an initial setpoint; the resulting blood flowrate through the MCS device, or optionally around or both through and around the MCS device, may be detected and calculated, for example using calculation and data processing techniques described herein; the algorithm may compare the calculated flowrate with the desired set flowrate and adjust the output motor voltage accordingly to bring the calculated flowrate toward the set flowrate.

Optionally, the calculated velocity or volumetric flowrate could be used as a feedback parameter in a control algorithm to assess functionality of the MCS device. For example, experiential data may be collected to determine a range of flowrate of blood through a properly functioning MCS device that may be associated with a given motor current draw or motor voltage output (or vice versa); if, in use, the calculated velocity or flowrate is not within the expected range for the motor current draw or motor voltage, the algorithm may determine that the MCS device is not functioning as expected and an action may be taken, for example a warning message may be displayed or an operating setpoint may be adjusted or another reaction may be taken. For example, if calculated velocity or flowrate is lower than the expected range for a given motor current draw or voltage, the MCS device may have an occluded inlet window; the algorithm may react by delivering a warning message to a user that a possible occlusion or suction event is occurring and to remedy by adjusting position of the MCS device, or a suction event remedy algorithm may be performed wherein the motor is controlled to pause or reverse for a brief period (e.g., less than or equal to 2 seconds, less than or equal to 1 second) then return to the previous speed, optionally ramping up to the previous speed.

FIG. 8 shows how one or more optical fibers may be connected to an MCS device and coiled around the inlet tube 102, for example following the pitch of laser cuts in a structural component of the inlet tube. Distal tips of the optical fiber(s) may terminate somewhere along the length of the inlet tube to measure flow rate 118 in the inlet tube 102. Alternatively, as shown in FIG. 8, one or more optical fibers may terminate distal to the inlet tube, for example in a nose piece 114 aiming forward, i.e., distal to the nose piece to measure flow in front of the tip of the catheter, or aiming backward, i.e., into the inlet tube from the nose piece 114, which may include a micro-optic prism or lens to direct an emitted beam or reflected light. Such an arrangement may have an advantage of less interruption of flow in the inlet tube or ease of manufacturing.

FIG. 9A shows an alternative embodiment of an MCS pump 101 having a laser source and receptor contained in a nose piece 114. FIG. 9B shows a schematic cross section of the device of FIG. 9A. This design does not use optical fibers to transmit light along the length of the catheter from the laser source to the inlet tube or region proximate to the MCS device. Instead, a laser source 161, such as a vertical-cavity surface-emitting laser (VCSEL) and one or more photodiodes 162, 163 are integrated into the nosepiece 114, optionally allowing space for a guidewire lumen 113. Additional electronics, such as a preamplifier, driver or analog/digital converter 164 may be contained within the nosepiece 114. Optionally, an electronics manifold or circuit board that connects the laser source 161, photodiode(s) 162, 163 and additional electronics 164 to one another and to a conductor 174 may be included in the nosepiece 114. Electrical conductor 174 may transmit a signal, such as a digital signal, from the electronics in the nosepiece 114 to a control console external to the patient where it is processed to provide assessment of blood flow rate. Furthermore, the conductor 174 may also send electrical power from the console to the laser source and additional electronics. The conductor 174 may be helically wound around the inlet tube 102, optionally following helical laser cuts (e.g., between or within laser cuts) in the inlet tube, and fastened to the inlet tube, for example with adhesive or held in place between a membrane 124 and the inlet tube 102. When the conductor is helically wound it allows the inlet tube to remain flexible.

In any of the configurations disclosed, light absorption by blood in the patient may be measured, optionally over a range of frequencies, optionally in moving or still blood, to provide an indication of hemoglobin concentration based on the fact that blood has different absorption spectra for different oxygen levels. A software algorithm stored in a control console 150 may use inputs such as intensity of light captured by the photodiode 152 for a delivered light intensity and frequency to calculate light absorption, which can be used in a lookup table to identify hemoglobin concentration of the blood.

In an alternative way to assess hemoglobin, a range of laser wavelength may be delivered to the patient's blood. The wavelength of the light is an important parameter that controls where and how much the light is scattered, due to the non-trivial absorption and scattering-spectrum of blood. The latter additionally depends on the oxy-hemoglobin content which can be obtained as an additional parameter by the evaluation of an absorption spectrum or the amplitude of reflected light. It might therefore be beneficial to use a tunable laser light source to obtain such a spectrum. Optionally, the LVD module 156 or control console 150 may be configured to allow a user to tune the laser light source wavelength, for example within a range of 390 to 750 nm (optionally in a range of 640 to 750 nm). For example, a user-controlled actuator may adjust the wavelength of the laser light source or may signal an algorithm to deliver a range of wavelengths to obtain a resulting absorption spectrum, which may be used to evaluate oxy-hemoglobin content of the blood. The controller 150 may display oxy-hemoglobin content on a user interface.

In any of the configurations disclosed, viscosity of the blood flowing through the inlet cannula 102 may be assessed from the shape of Doppler spectra captured by the photodiode as a result of passing light from an optical fiber through the blood flow. Viscosity can be conceptualized as quantifying the internal frictional force that arises between adjacent layers of fluid that are in relative motion. For instance, when a fluid is forced through a tube, it flows more quickly near the tube's axis than near its walls. Viscosity is related to the difference in flow rate near the axis compared to the flow rate near the inlet cannula wall. Although a laser may be focused on a particular region in the inlet cannula, for example a high flow region near or at the axis of the inlet cannula, the light will reflect off of blood cells in the beam path, which can include slower moving blood near the wall, faster moving blood near the axis, and blood flowing in a range between the slower and faster moving blood. A broad scattering of light collects many different velocity components that in turn lead to a broad Doppler spectrum. The exact shape of the spectrum may be an indicator of the viscosity of the medium, since higher viscosity media do exhibit more velocity components (towards the edge of the tube) as compared to lower viscosity media.

A Doppler parameter can be understood here to mean a parameter which represents information about a change in a frequency of a signal emitted in the fluid to a frequency of a signal received in the fluid. For example, the Doppler parameter corresponds to a Doppler shift. In the present case, a Doppler spectrum can be understood to mean a spectrum which contains frequencies which are from a result in the signal emitted in the fluid and contains frequencies which result from a signal received in the fluid. In this way, for example, an evaluation of the Doppler shift of different frequency components of signals emitted into the fluid can be made possible in relation to the frequency components that result from signals received from the fluid. A larger range in blood flow can result in a larger range of frequencies resulting from light received in the fluid and therefor provide an evaluation of viscosity. The range of frequencies may be represented by a width of the Doppler spectrum.

Example Laser Doppler Velocimetry (LDV) Measurement Configuration

Figure 10:
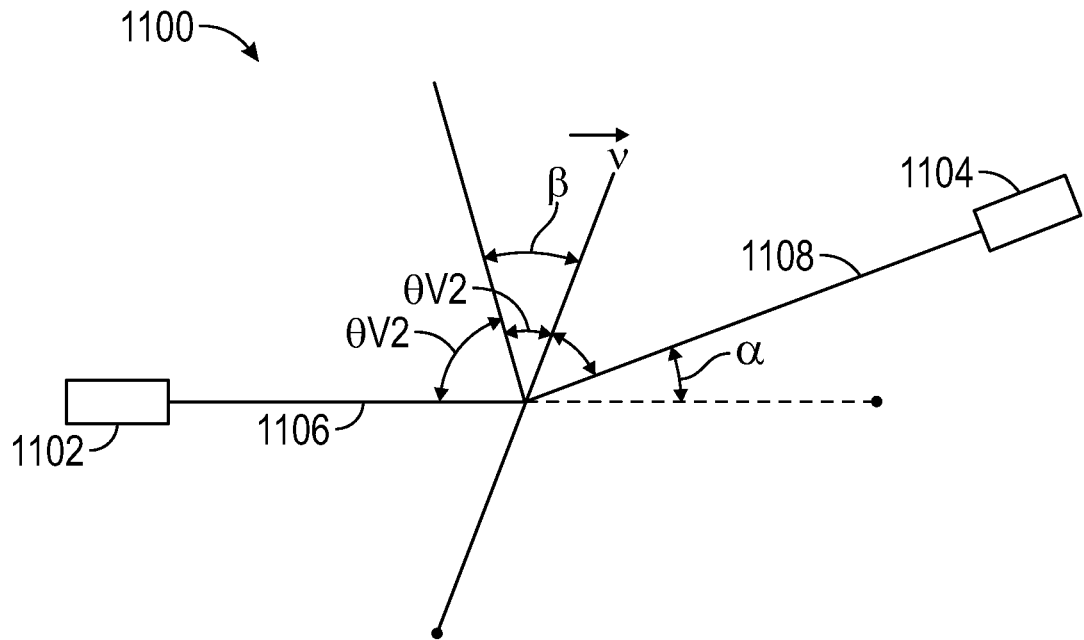
FIG. 10 shows a schematic representation of an LDV geometry according to an example configuration.
Figure 11:
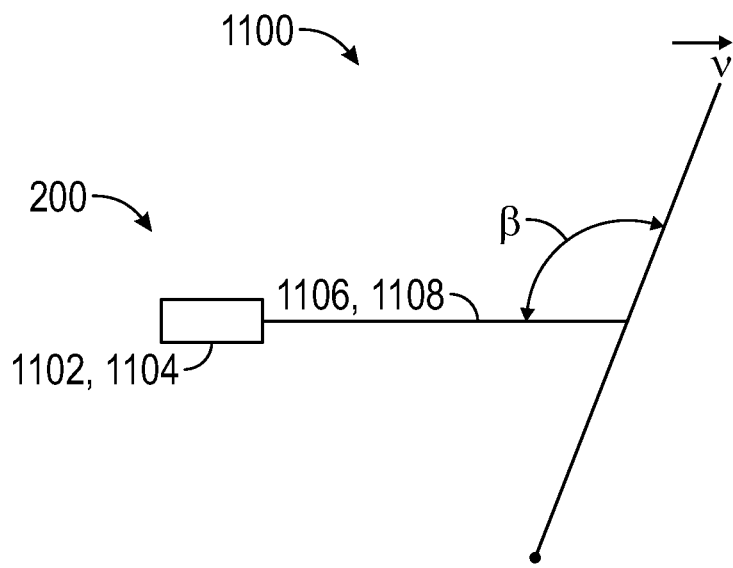
FIG. 11 shows a schematic representation of an LDV geometry according to an example configuration.

One or more methods to evaluate volumetric flow rate using Laser Doppler Velocimetry (LDV) or Laser Doppler Anemometry (LDA) may be used by systems and methods described herein. In some examples described herein, LDV may be used to determine a control signal to adjust or set a set a pump speed in a cardiac support system to, for example, a predetermined value As referenced herein, LDV or LDA may be used as part of an optical procedure by which a peripheral blood flow of a person may be measured, such as in connection with a cardiac support system. FIGS. 10 and 11 show schematic representations of an LDV geometry 1100 according to example implementations of systems and methods described herein. FIG. 10 shows an example configuration in which a light source 1102 and sensor element 1104 are spatially separated. FIG. 11 shows an example configuration in which a light source 1102 and a sensor element 1104 are adjacent or integrated into a single component, such as a measuring device 200.

According to illustrated example in FIG. 10, an LDV geometry 1100 may include a light source 1102, such as a laser, and a sensor element 1104, such as a detector. The light source 1102 and the sensor element 1104 may be arranged spatially separated from each other according to one example. According to the illustrated example, the light source 1102 may emit a light beam 1106. The emitted beam 1106 may be incident on a moving body fluid, such as blood or blood particles. The incident beam may be deflected by a deflection angle α and/or reflected as a reflected partial beam 1108. A difference in frequency, or Doppler frequency shift, of the deflected or reflected light compared to the emitted light may be measurable and used to calculate flow rate, v, of the body fluid. The Doppler frequency shift depends on the flow rate, v, of the body fluid, and/or on particles contained therein, such as blood cells, the angle at which the light beam 1106 strikes the blood and thus, at least a portion of the blood particles, and the angle of observation. According to the design example in FIG. 10, the light beam 1106 hits the body fluid at an oblique angle to the direction of flow of the body fluid. Based on the Doppler effect, the frequency shift $f_D$ can be measured and used to calculate flow rate v. According to this execution example, the flow rate, v, may be calculated using the following formula, wherein the emitted light beam 1106 has a known frequency f and the reflected light beam 1108 has a frequency $f+f_D$, λ is the wavelength of the emitted light beam 106:

$$f_D = \frac{2v}{\lambda}\cos\beta\sin\frac{\alpha}{2}$$

FIG. 11 shows another example schematic representation of an LDV geometry 1100. The geometry 1100 shown in FIG. 11 shows the position of the sensor element 1104 as different than in FIG. 10. As illustrated, the sensor element 1104 may be integrated together with the light source 1102 in a measuring device 200. The light source 1102 and the sensor element 1104 may therefore positioned together. In such a configuration, the light source 1102 may emit the light beam 1106, which at least partially reflects off of flowing blood particles. The angle R describes the angle between the light beam 1106 and the flow direction of the body fluid.

The measuring device 200, such as illustrated in FIG. 11 may be disposed in a cardiac support system. The cardiac support system may additionally include a pumping device for moving the body fluid, wherein a pumping capacity of the pumping device can be adjusted by using an adjustment signal. The measuring device 200 can be designed to measure the flow rate of the body fluid through the cardiac support system and/or through a blood vessel.

A measuring device 200 may include at least the light source 1102 configured to output a light beam 1106 and the at least one sensor element 1104 for detecting the reflected partial beam 1108 of the emitted light beam 1106. In some examples, the measuring device 200 may be configured to provide a measuring signal representing the flow velocity using the reflected partial beam 1108. In some examples, one or more separate hardware processors may be configured to receive one or more signals from the measuring device 200 and output a measuring signal representative of the flow velocity. The measuring device 200 or one or more hardware processors configured to receive information from the measuring device 200 can be configured, for example, to determine the measurement signal using a Doppler frequency shift or interference between the reflected partial beam and optionally another beam. In examples where a sensor element 1104 is spatially separated from a light source 1102, the sensor element 1104 or one or more hardware processors in communication with the sensor element 1104 may be configured to perform similar or the same functions to those described herein with reference to the measuring device 200.

Advantageously, according to some examples, the configuration described with reference to FIG. 10 or 11 enables a flow rate of body fluid to be measured in a patient's body such as in a heart or blood vessel or within a heart pump positioned in the patient's cardiovascular system by utilizing, for example, the measuring device 200 as a compact blood flow sensor. When a component of a heart pump, the signal from the measuring device 200 may be used to control pump parameters, such as a pump speed. For example, a cardiac support system that includes a measuring device 200 may include one or more components (such as one or more hardware processors, not shown in FIG. 11), configured to determine an adjustment signal for a heart pump associated with the cardiac support system based at least in part on the measurement signal. The cardiac support system may, in some examples, be configured to use a measurement signal to reduce, maintain, or otherwise control a pump speed to achieve a given value. This may be possible, for example, by adaptively adjusting the blood flow to physical stress, a daily rhythm or mechanical loads. The approach presented herein reduces the space required and the voltage needed to operate the cardiac support system.

According to some examples, the measuring device 200 may be realized as a compact optical LDV sensor, which comprises the light source 1102 (which may include a laser) and the sensor element 1104 (also sometimes referred to as a detector) in one component. The measuring device 200 may be associated with or part of a ventricular assist device (VAD) for controlling a heart pump function. Optionally, the measuring device can include multiple light sources 1102 and/or sensor devices 1104. The light source 1102 may include a Vertical Cavity Surface Emitting Laser (VCSEL).

A flow rate may be determined by means of a Doppler measuring method, which is based on self-mixing-interferometry as a measurement technique. This method of flow rate determination may allow for reduced or low power consumption. In some examples, an accuracy of a flow rate determination may be improved by ultrasonic measurements, wherein, in some examples, a Doppler frequency for LDV may be in the MHz range, and ultrasound frequency may be in the kHz range.

The measuring device 200 described herein may be compact and configured to measure a variety of fluid volumes based, at least in part, on a suitable choice of wavelength. For a wavelength of, for example, 850 nm, the measuring volume may be a few cubic millimeters, while for higher wavelengths, for example 1200 nm, the measuring volume may be in the range of cubic centimeters.

The flow rate v of the body fluid may be determined, for example, by use of the Doppler effect. Referring to FIG. 11, this involves a frequency shift $f_D$ between the incident wave 1106 and the backscattered wave 1108 from scattering bodies, such as particles or blood cells, which is also referred to here as reflected partial beam 1108. The Doppler frequency $f_D$ is then determined using the following formula:

$$f_D = \frac{2v}{\lambda}\cos\beta$$

Thus, the Doppler frequency is calculated by using the flow rate v, or a movement speed of the scattering body, the irradiated wavelength λ of the light beam 1106 and the angle β between the moving scattering body and the laser beam 1106.

According to some examples, a light source 1102 may be a collimated, monochromatic and coherent laser. One size d of backscattering particles in the blood should not be much smaller than the wavelength of the irradiated light beam 1106. Furthermore, a low absorption rate of the liquid to be examined is advantageous to obtain a sufficiently high reflected intensity. The LDV measurement can be performed in one or more ways, such as using the single-beam method. In the single-beam method, the Doppler frequency shift depends on the speed of the measurement with a light beam 1106, the direction of the passing particles and from an observation angle. The backscattered laser light, which is here referred to as reflected partial beam 1108, is only slightly frequency shifted, so that a measurement can only be achieved with a very sharp-edged filter.

The so-called heterodyne principle, in contrast to the single beam method, allows simple measurability by exploiting the interference of two beams or two sensor elements. The interference shifts a high Doppler-shifted frequency of light, for example 1014 Hz, into the more accessible low-frequency range, so that an intensity modulation ("beating") is created. A Reference-Beam, Single-Beam, Dual-Scatter and Dual-Beam can be distinguished, as they are shown in at least one of the Figures disclosed herein. In the reference beam process, for example, a light beam is split into two partial beams. A partial beam is passed through the liquid and then interferes at the sensor element 1104 with an undisturbed partial beam that serves as a reference beam. In the single-beam method, the scattered laser beam is detected at two angles.

Figure 12:
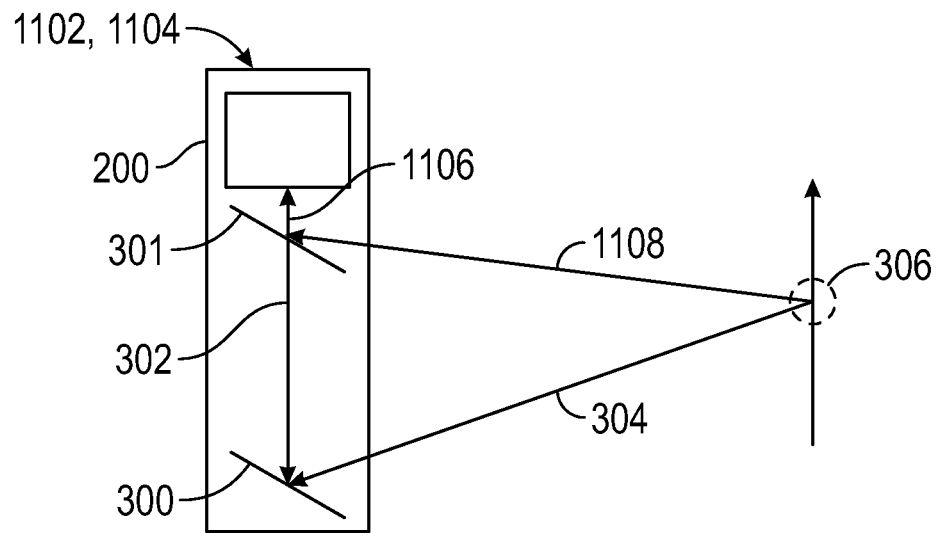
FIG. 12 shows a schematic representation of a measuring device of a cardiac support system according to an example configuration.

FIG. 12 shows a schematic representation of a measuring device 200 of a cardiac support system according to a design example. The measuring device 200 shown here can be implemented in a cardiac support system as described in FIG. 11. The measuring device 200 is optionally arranged parallel to the flow direction of the body fluid. The system may include a first deflecting element 300 and a second deflecting element 301. The first and/or second deflecting elements 300, 301 may be micro mirrors. Each of the deflecting elements 300, 301 may be configured to deflect the light beam 1106 and/or a further beam 302. The deflecting elements 300, 301 may be arranged in such a way that the reflected partial beam 1108 and/or a further reflected partial beam 304 impinge on an interference area 306 in the vessel (e.g., inlet cannula or blood vessel) and are reflected in the direction of the respective other deflecting element 300, 301, where the reflected partial beams 1108, 304 are deflected back in the direction of the light source 1102 and are detected and further processed by the sensor element 1104. One beam path is triangular according to this example. The second deflecting element 301 may be realized as a semi-transparent mirror according to a design example.

The measuring device 200, which can be described as a sensor module, can include at least one light source 1102, for example a laser, whose light beam 1106 is split by the deflection elements 300, 301 and the sensor element 1104. The deflection elements 300, 301 may include micro-optics in some examples. In the illustrated configuration in FIG. 12, the light beam 1106 may be split into two beams 1108, 304 and directed to the liquid at an interference region 306. The rays interfere may interfere in the liquid to be examined (such as the flowing body fluid) and form a standing interference pattern. If a scattering object passes the interference region 306, a frequency of the intensity backscattered into the sensor element 1104 can be related to the flow velocity. This method of determining flow velocity may be sometimes referred to as dual-beam method and is advantageously, very precise.

Figure 13:
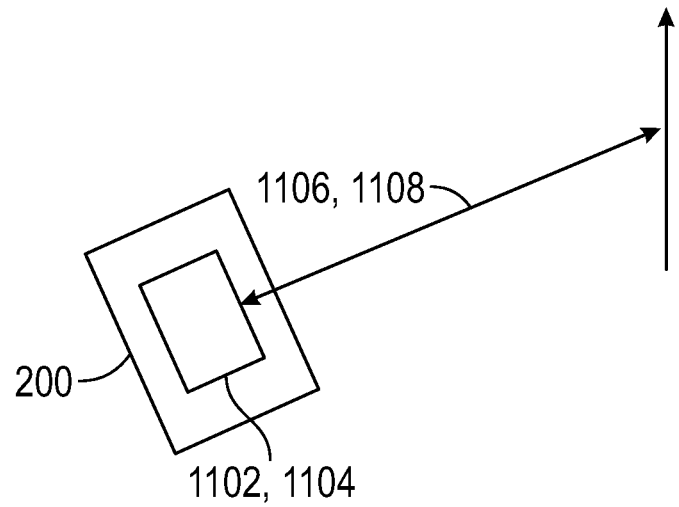
FIG. 13 shows a schematic representation of an execution example of a measuring device of a heart support system.

FIG. 13 shows a schematic representation of an example of a measuring device 200 of a cardiac support system. The measuring device 200 shown in FIG. 13 corresponds to an implementation of the measuring device 200 described in FIG. 11. In the illustrated configuration, light source 1102 and sensor element 1104 may be integrated into each other at one position so that the light beam 1106 and the reflected partial beam 1108 cover the same beam path. Additionally, the measuring device 200 may be arranged at an oblique angle relative to the flow direction of the body fluid, shown as a vertical arrow. According to the example illustrated in FIG. 13, a Reference-Beam equivalent, self-mixing-interference (SMI), is shown. The measuring device 200 has the light source 1102 with integrated sensor element 1104. The back reflection, i.e., the reflected partial beam 1108, is interfered by flowing particles inside a laser cavity with a laser field. Finally, the integrated sensor element 1104 can be used to measure the intensity modulation. The SMI method in particular favors a compact size of the measuring device 200, also known as sensor module, because it can be implemented, for example, with a VCSEL with a monolithically integrated detector.

Figure 14:
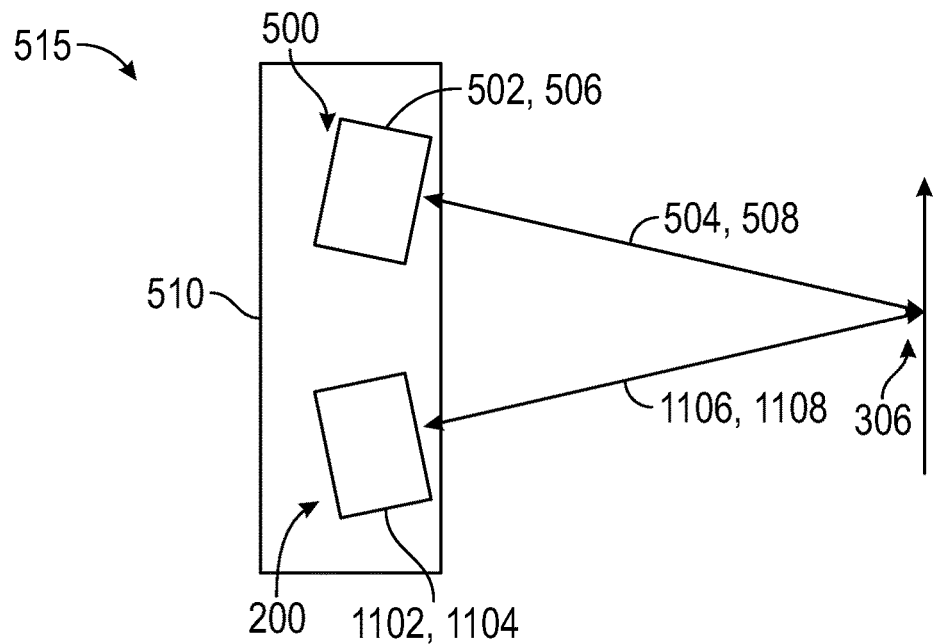
FIG. 14 shows a schematic representation of an example of a measuring device of a cardiac support system.

FIG. 14 shows a schematic representation of an example of a measuring device 200 of a cardiac support system. The measuring device 200 shown here corresponds to an implementation of a measuring device such as described with reference to FIG. 13. According to the illustrated example, the cardiac support system may include a further measuring device 500 for measuring the flow rate of the body fluid. The further measuring device 500 can include at least one further light source 502 for emitting a further light beam 504 and at least one further sensor element 506 for detecting a further reflected partial beam 508 of the further light beam 504. The further measuring device 500 can be designed, for example, to provide a further measuring signal representing the flow rate using the further reflected partial beam 508, which is used, for example, by a further determination device to determine the adjustment signal. According to some examples, the measuring device 200 and the further measuring device 500 can be arranged at an angle to the direction of flow of the body fluid. Furthermore, the measuring devices 200, 500 may be arranged together in a housing 510 and at an angle to each other so that the light beams 1106, 504 meet in the interference range 306. In some examples, the measuring device 200 and/or the further measuring device 500 may be configured to operate as an LDV sensor, for example. According to some examples, the measuring fixture 200 and/or the further measuring fixture 500 together with the housing 510 may form a measuring module 515.

A measuring module 515 may perform similar functions to the measuring device 200 described in FIG. 13. For example, the measuring module 515 may include the additional measuring device 500 inclined to the first measuring device 500 so as to emit light towards an interference region 306 in a similar manner as the optics 300, 301 are inclined so as to reflect light towards an interference region 306. The two light sources 1102, 502 may each have an integrated or associated sensor element 1104, 506 spatially near to the light source(s) 1102, 502 respectively. A sensor element 1104, 506 may sometimes be referred to as a photodetector.

By using two light sources 1102, 502 and a triangular current modulation of the light sources 1102, 502, the flow direction of the backscattered particles can be determined. For example, the structure of an LDV sensor shown here is based on a heterodyne SMI method with two light sources 1102, 502 and sensor elements 1104, 506.

Example Cardiac Support System with a Measuring Device

Figure 15:
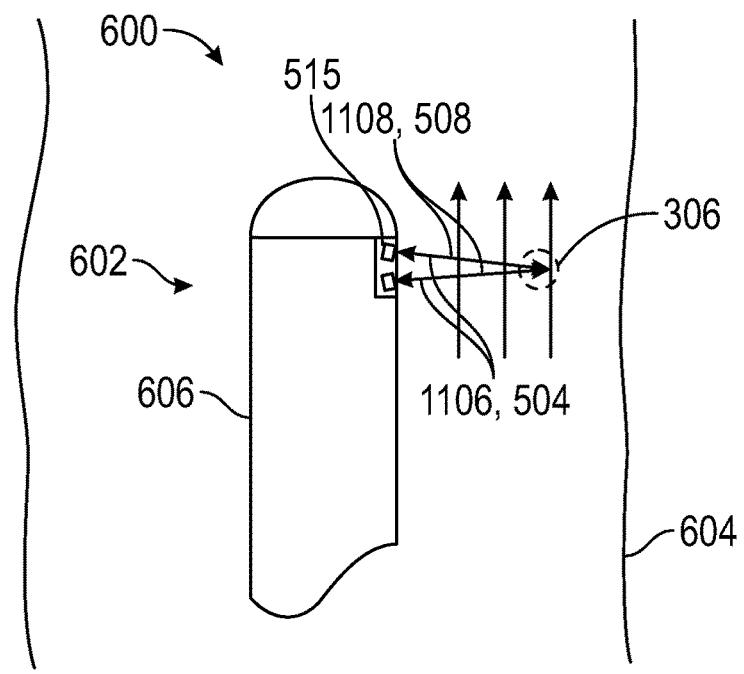
FIG. 15 shows a partial schematic diagram of a cardiac support system according to an example configuration.

FIG. 15 shows a schematic representation of a Cardiac Support System 600 according to a design example. According to some examples, only a section of the Cardiac Support System 600 is optionally shown. Furthermore, it is similar to a Cardiac Support System 600 as mentioned in one of FIGS. 10-14. The measuring module 515, or the measuring device may be located at a pump outlet (for example in front of or behind an opening of the pump unit 602). The function of the measuring device may correspond, for example, to the function described in FIGS. 12 and/or 14. According to some examples, the pump unit 602 may be located centrally in a blood vessel 604 or at least partially in heart chamber such as a left ventricle of a patient. The measuring module 515 may be arranged in a wall area of the pumping device 602. In some examples, the measuring module 515 may be arranged on a pumping element 606 of the pumping device 602 so that at least one light beam 1106, 504 hits the interference area 306. The measuring module 515 and/or at least the measuring device may be located, for example, at a pump outlet or at a pump tip of the pump element 606. The pump unit 602 may include a tube or tubular element, on or in which the light source and/or the sensor element are arranged optionally at one tube end.

According to the example illustrated in FIG. 15, the flow velocity may be measured outside the pumping device 602. For example, the system may measure the flow velocity after the blood has left the pump. The measured total blood flow is the sum of the flow generated by the pump and the flow generated by the residual activity of then heart results. The volume flow can only be calculated if the flow cross-section is known or assumed. For this purpose, the 515 Measuring Module may be installed, for example, on the motor housing after the pump outlet. Several Measuring Modules 515 can additionally or alternatively be arranged on one housing with, for example, an interference area 306 on the opposite pump side.

Figure 16:
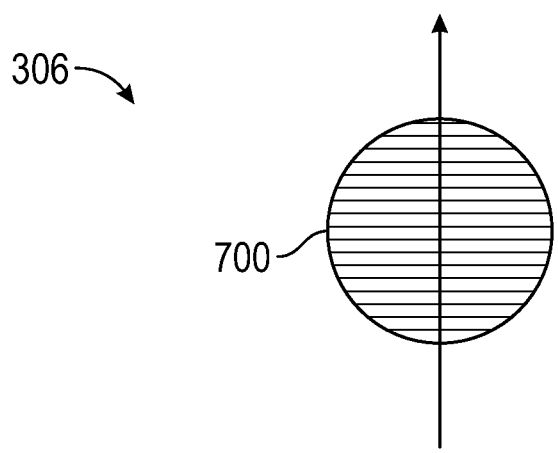
FIG. 16 shows a schematic representation of an interference area according to an example implementation.

FIG. 16 shows a schematic representation of an interference zone 306 according to a design example. The interference region 306 can be seen in the flowing body fluid according to some examples. The means that the sensor module detects an interference pattern 700 in the interference range 306, which is generated by a so-called dual-beam method. The measuring device, as described in FIG. 2 or 6, for example, is designed to generate and evaluate such an interference pattern 700 in the interference region 306. The dual-beam method is characterized by the fact that a light beam from a light source, for example a laser beam, is split into two partial beams that are focused on the interference region 306. The partial beams interfere in the body fluid to be examined and form the standing Interference pattern 700: When a scattering object passes the interference pattern 700, the frequency of the intensity backscattered into the detector, called the sensor element, is related to the flow velocity.

Figure 17:
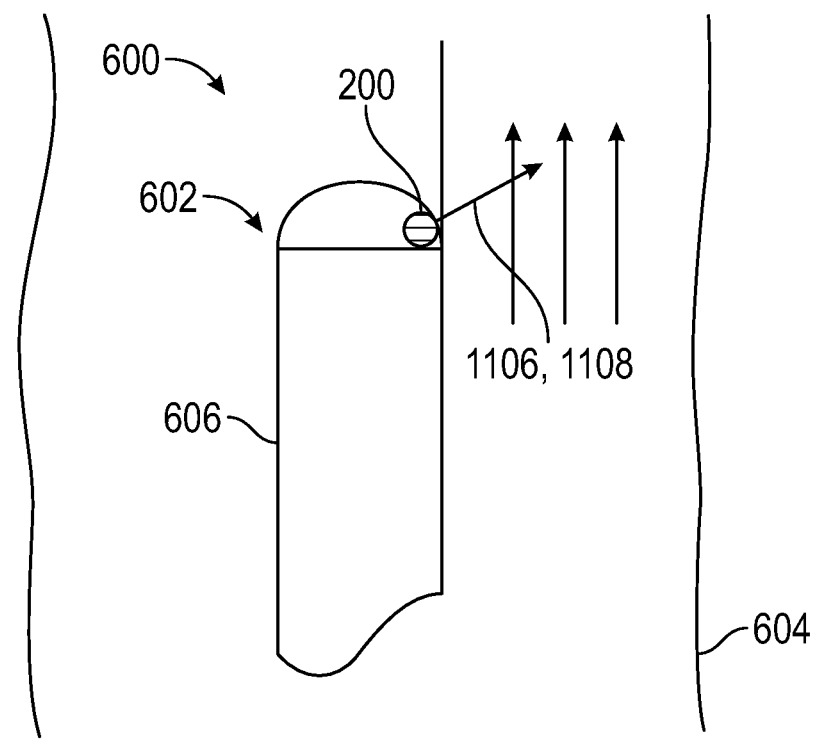
FIG. 17 shows a partial schematic representation of a cardiac support system according to an example implementation.

FIG. 17 shows a schematic representation of a Cardiac Support System 600 according to a design example. The Cardiac Support System 600 shown here is at least similar to the Cardiac Support System 600 described in FIG. 15. A position of the measuring device 200 differs from FIG. 15 in that the measuring device 200 may be mounted at a tip of the pumping device 602 or a pump outlet. According to this example, measuring device 200 functions like measuring device 200 in FIG. 11 or 13. According to this example, the flow rate is also measured outside the pumping device 602. The body fluid flows, for example, with low turbulence through the blood vessel 604.

Figure 18:
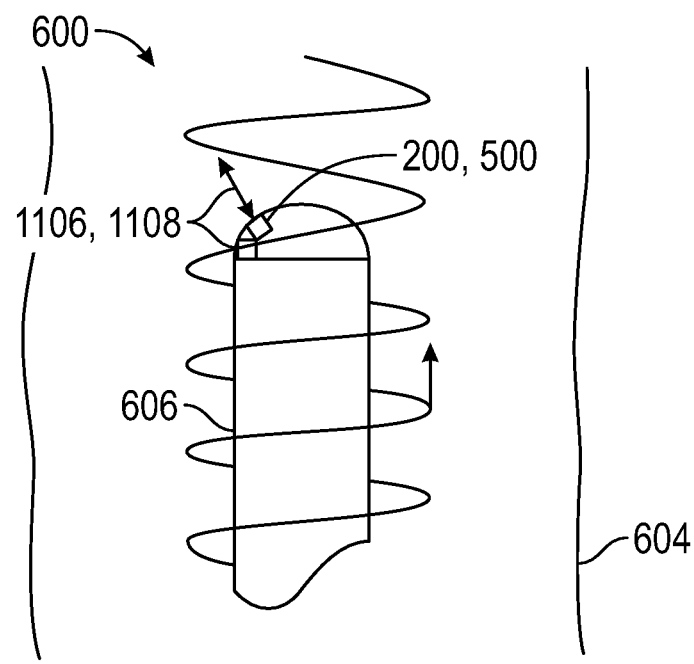
FIG. 18 shows a partial schematic representation of a cardiac support system according to an example implementation.

FIG. 18 shows a schematic diagram of a Cardiac Support System 600 according to a design example. The Cardiac Support System 600 shown here is at least similar to the Heart Support System 600. According to some examples, it has a further measuring device 500 at the pump outlet in addition to measuring device 200. According to some examples, the flow rate is measured outside the pump device 602. Furthermore, the body fluid flows vortex-like around the Heart Support System 600.

According to some examples, two measuring devices 200, 500 are shown, which are installed at the pump outlet. The measuring fixtures 200, 500 are aligned in such a way that the translatory and the rotatory part of the turbulent flow can be determined. In the area after the pump outlet strong turbulences in the flow are to be expected. Therefore, according to some examples, one of the measuring devices 200, 500 with tangential orientation can be used to measure a rotational part of the flow. The approach presented here is based on the SMI-method.

Figure 19:
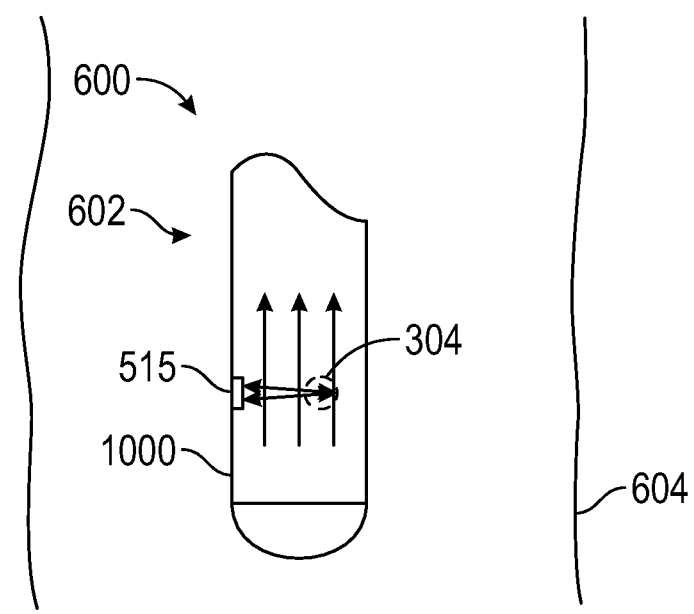
FIG. 19 shows a partial schematic representation of a cardiac support system according to an example implementation.

FIG. 19 shows a schematic diagram of a Cardiac Support System 600 according to a design example. According to this example, the measuring module 515 may be installed in the tubular element 1000 of the pumping device 602. According to some examples, the Measuring Module 515 may function, optionally, like the Measuring Module(s) 515 described with reference to FIG. 14 or 15.

The flow rate to be measured may be measured inside the pipe element 1000. According to some examples, an integration of the measuring module 515 is shown in the pipe element 1000 of the pump unit 602, also called suction pipe. Here, the flow velocity during the suction of the blood to the pump unit 602 can be measured. The measured blood flow is, in this configuration, exclusively the portion generated by the pumping device 602 and ignores the blood flow resulting from the residual activity of the heart. Knowledge of the flow behavior is, thus, much easier to understand due to the known geometry, and accordingly, calculation of the volume flow is more easily obtained. In some configurations, the tubular element 1000 may contain several Measuring modules 515.

Figure 20:
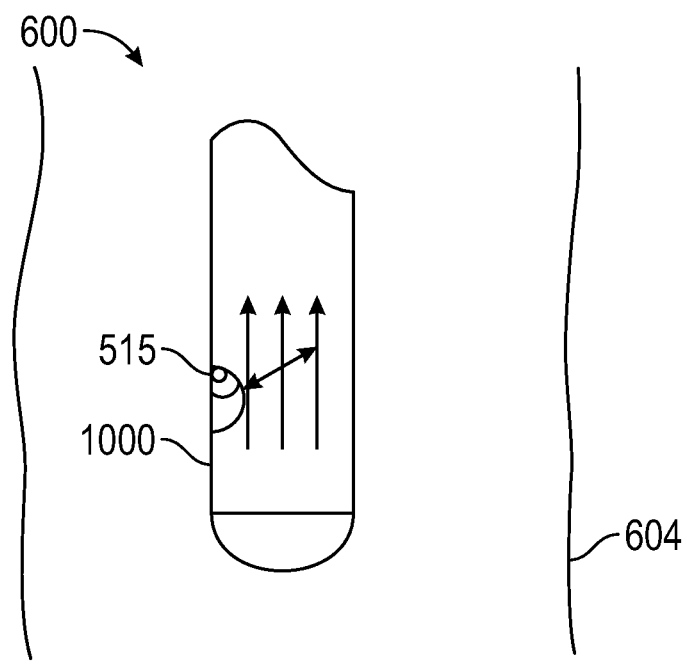
FIG. 20 shows a partial schematic representation of a cardiac support system according to an example implementation.

FIG. 20 shows a schematic diagram of a Cardiac Support System 600 according to a design example. The Cardiac Support System 600 shown here is at least similar to the Heart Support System 600. Only the measuring device 200 corresponds to the measuring device 200 described in one of the FIGS. 11, 13, and 17. The flow rate to be measured is measured inside the tubular element 1000.

Figure 21:
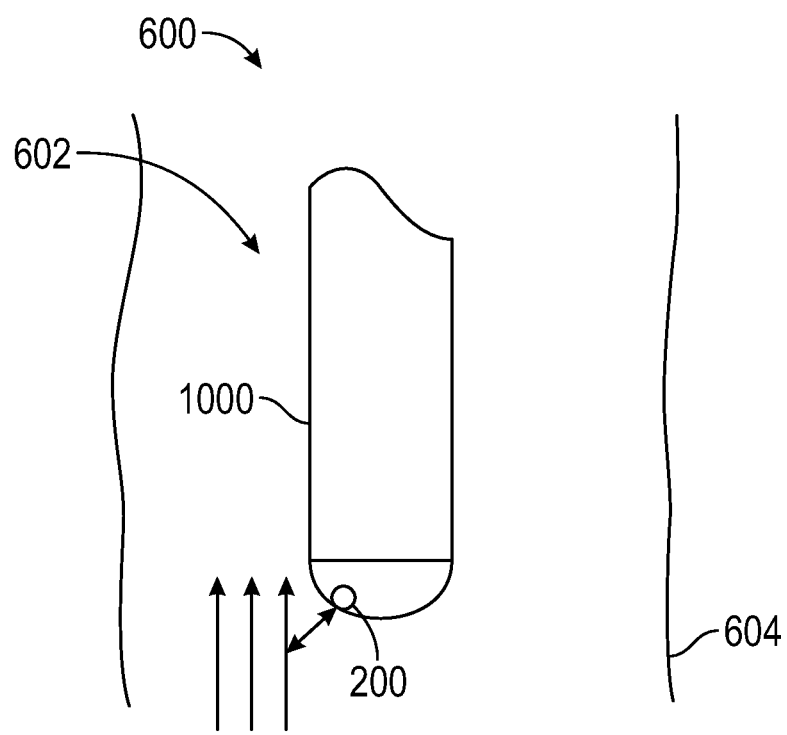
FIG. 21 shows a partial schematic representation of a cardiac support system according to an example implementation.

FIG. 21 shows a schematic representation of a Cardiac Support System 600 according to a design example. The heart support system 600 shown here is at least similar to the heart support system 600 described in FIG. 17. Only the position of the measuring device 200 differs from FIG. 17, since the measuring device 200 is positioned according to this Example of design on a pump tip, i.e., located at one end of the pipe element 1000 of the pump unit 602. In other words, according to some examples, the measuring device 200 is installed at the tip of the tubular element 1000 and detects the portion of blood aspirated by the pumping device 602 and the portion resulting from residual activity.

Example Operation of a Cardiac Support System

Figure 22:
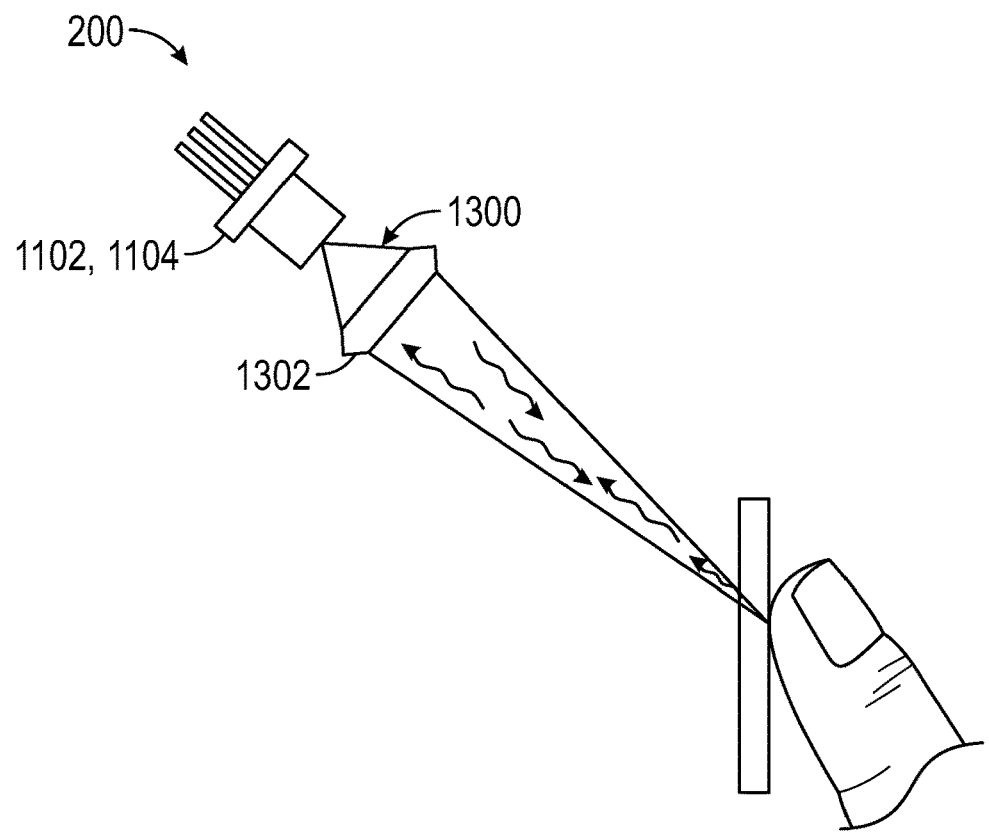
FIG. 22 shows a schematic representation of an example of a measuring device.

FIG. 22 shows a schematic representation of an example of how a measuring device 200 may function. The function shown here may correspond or resemble the examples described in any one of the FIG. 11, 13, 17, 20 or 21.

In some examples, a measuring device 200 may include a light source 1102. The light source 1102 may emit a beam of rays 1300. The beam of rays may be focused by a lens 1302, for example, on an area, such as the interference area, in which at least the partial beam 1108 is reflected to the sensor element 1104. The sensor element 1104 may be arranged, according to some examples, with the identically positioned light source 1102 as part of the measuring device 200. According to some examples, the measuring device 200 may equipped with a Radiation bundle 1300 in the backscatter geometry. Light source 1102 and sensor element 1104 may be arranged in the same component. If, for example, a scattering object moves along the beam direction of beam 1300, a very small portion of backscattered light can be frequency-shifted back into the cavity of light source 1102. This backscattered light may serve as external feedback by interfering with a laser field in the cavity. The external feedback can lead to an interference within the cavity that changes with the Doppler frequency (fDoppler=fFeedback−fRadiated). This change may result in a periodically varying output power of the laser with the Doppler frequency. In each of the light sources 1102, a sensor element 1104 may be integrated which measures the periodically varying output power. A frequency analysis ultimately then may make it possible to determine the Doppler frequency and thus, for example, the flow velocity of backscattering particles in liquids.

Figure 23:
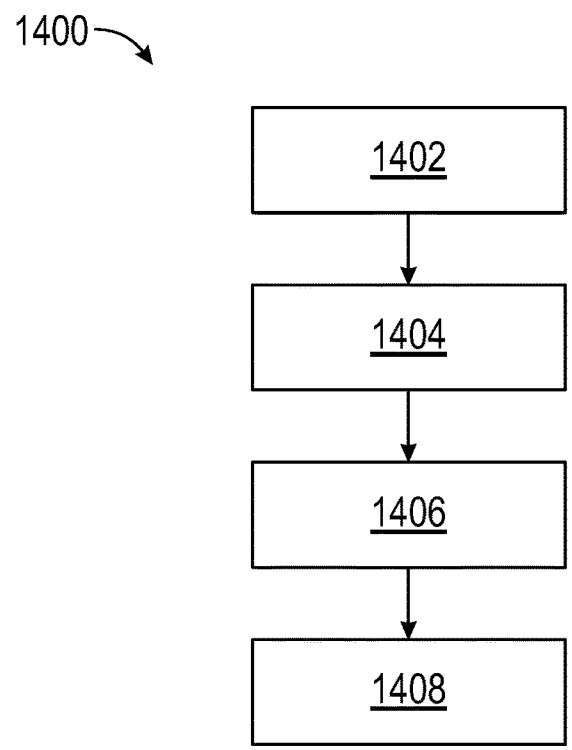
FIG. 23 shows a flow chart of a process for operating a cardiac support system according to an example implementation.

FIG. 23 shows a flowchart of a Procedure 1400 for operating a cardiac support system according to an execution example. Procedure 1400 can be used to operate a cardiac assist system with a measuring device, such as described in one of FIGS. 10 to 22. For this purpose, Procedure 1400 includes a step 1402 of the output, one step 1404 of capture, one step 1406 of provisioning, and one step 1408 of determination and provisioning. In step 1402 of the output, a light beam is output. In step 1404 of capturing, a reflected partial beam of the light beam may be captured. In step 1406 of the provisioning process, a light beam representing the flow rate may be output and a measurement signal may be provided using the reflected partial beam. In step 1408 of the Determine and Provide procedure, an adjustment signal may be determined and provided using the measurement signal to adjust a pumping capacity of the pumping device.

Figure 24:
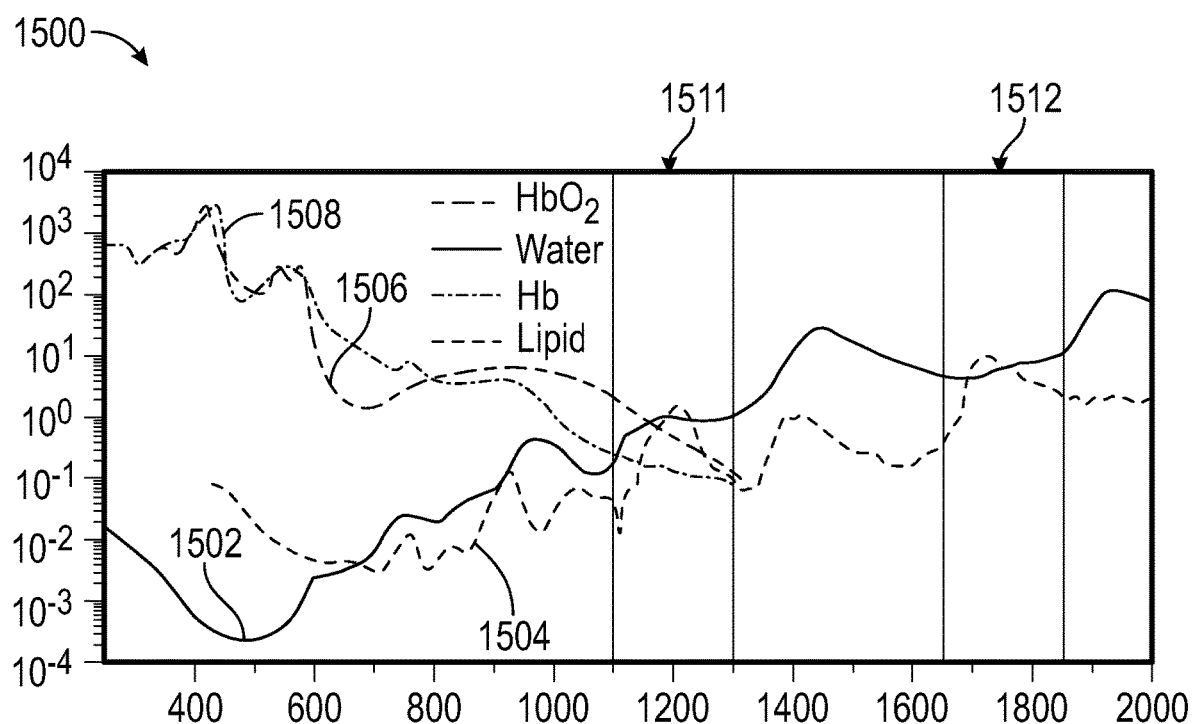
FIG. 24 shows a diagram representation of an optical absorption spectrum according to an example implementation.

FIG. 24 shows a diagram representation of an optical absorption spectrum 1500 according to an execution example. The abscissa shows the wavelength in nanometers and the ordinate the absorption coefficient in cm-1. A first curve 1502 may represent the optical absorption spectrum of water and a second curve 1504, that of a lipid. In a third curve 1506 the optical absorption spectrum of oxygen-rich blood (HbO2) is shown as well as the optical absorption spectrum of oxygen-poor blood (HbO) in a fourth curve 1508. While the first curve 1502 and the second curve 1504 tend to increase, the third curve 1506 and the fourth curve 1508 tend to decrease. Furthermore, a first optical window 1511 is shown in range from 1.1 µm to 1.3 µm and a second optical window 1512 in the range from 1.65 µm to 1.85 µm.

Any of the various aspects or embodiments of the cardiac assistance system and/or pump described herein with respect to FIGS. 1-24 may include, in addition or alternatively, various other features, such as those features shown in and described U.S. Application Publication No. 2022/0161019, entitled "PURGELESS MECHANICAL CIRCULATORY SUPPORT SYSTEM WITH MAGNETIC DRIVE", filed Nov. 18, 2021; U.S. Application Publication No. 2022/0161018, entitled "MECHANICAL CIRCULATORY SUPPORT SYSTEM WITH GUIDEWIRE AID", filed Nov. 18, 2021; U.S. Application Publication No. 2022/0161021, entitled "MECHANICAL CIRCULATORY SUPPORT SYSTEM WITH INSERTION TOOL", filed Nov. 18, 2021, the entire contents of each of which are incorporated herein and forms a part of this specification.

Terminology

Various modifications to the implementations described in this disclosure will be readily apparent to those skilled in the art, and the generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims can be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A Mechanical Circulatory Support (MCS) device comprising:
    an impeller housing;
    an inlet cannula connected to a distal end of the impeller housing; and
    an optical fiber,
    wherein the impeller housing comprises a first bearing arm connected to a bearing positioned at a central axis of the impeller housing, the first bearing arm comprising a bore, wherein a distal portion of the optical fiber is held in the bore.

2. The device of claim 1 comprising at least a second bearing arm.

3. The device of claim 2 wherein the first bearing arm has a thickness thicker than the at least a second bearing arm.

4. The device of claim 1, wherein the first bearing arm has a thickness of about 0.4 mm or greater.

5. The device of claim 2, wherein the second bearing arm has a thickness of about 0.2 mm.

6. The device of claim 1, wherein the optical fiber in part passes along an exterior surface of the impeller housing.

7. The device of claim 6, wherein the optical fiber is configured to be positioned along a spline of the impeller housing.

8. The device of claim 1, wherein the bore has an inner diameter in a range of 0.20 to 0.30 mm.

9. The device of claim 8, wherein the bore has an inner diameter comprising about 0.23 mm.

10. The device of claim 1, wherein the bore is at an angle with respect to the central axis of the impeller housing in a range of 10 to 20 degrees.

11. The device of claim 10, wherein the bore is at an angle of above 15 degrees.

12. The device of claim 1, wherein the distal portion of the optical fiber or the bore is aimed into a flow lumen of the inlet cannula.

13. The device of claim 1, wherein the distal portion of the optical fiber or the bore is aimed at the central axis.

14. The device of claim 1, wherein the distal portion of the optical fiber or the bore is aimed to the side of the central axis.

15. The device of claim 1, wherein a distal end of the optical fiber is positioned flush with a surface of the first bearing arm.

* * * * *